US006958988B1

(12) United States Patent
Okagawa et al.

(10) Patent No.: US 6,958,988 B1
(45) Date of Patent: Oct. 25, 2005

(54) MOBILE COMMUNICATION NETWORK AND DATA DELIVERY METHOD IN MOBILE COMMUNICATIONS NETWORK

(75) Inventors: Takatoshi Okagawa, Kanagawa (JP); Shigeo Tanimoto, Kanagawa (JP); Fumiaki Ishino, Tokyo (JP); Yoji Osako, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 844 days.

(21) Appl. No.: 09/762,193

(22) PCT Filed: Jun. 2, 2000

(86) PCT No.: PCT/JP00/03598

§ 371 (c)(1),
(2), (4) Date: Feb. 2, 2001

(87) PCT Pub. No.: WO00/76247

PCT Pub. Date: Dec. 14, 2000

(30) Foreign Application Priority Data

Jun. 4, 1999 (JP) .................................. 11-158524

(51) Int. Cl.[7] .............................................. H04Q 7/24
(52) U.S. Cl. ...................................... 370/338; 370/331
(58) Field of Search ................................. 370/338, 352, 370/353, 354, 356, 401, 477, 218, 331, 329, 370/392, 395.21, 328, 332, 344, 348, 337, 370/319, 395.5, 466, 395.52, 315, 465, 333, 370/351, 389, 390; 455/407, 408, 406, 436, 455/560

(56) References Cited

U.S. PATENT DOCUMENTS 5,159,592 A * 10/1992 Perkins ........................ 370/338
6,272,129 B1 * 8/2001 Dynarski et al. ............ 370/356
6,392,990 B1 * 5/2002 Tosey et al. ................. 370/218
6,466,571 B1 * 10/2002 Dynarski et al. ............ 370/352
6,473,411 B1 * 10/2002 Kumaki et al. ............. 370/331
6,504,839 B2 * 1/2003 Valentine et al. ........... 370/354
6,584,098 B1 * 6/2003 Dutnall ....................... 370/354
6,608,832 B2 * 8/2003 Forslow ...................... 370/353
6,636,504 B1 * 10/2003 Albers et al. ............... 370/352
6,647,426 B2 * 11/2003 Mohammed ................ 709/238

(Continued)

FOREIGN PATENT DOCUMENTS

EP          0 578 041 A2      1/1994      ........... H04L 12/56

(Continued)

OTHER PUBLICATIONS

Mobile IP Charles E. Perkins, Sun Microsystems May 1997, IEEE pp. 84-99.

(Continued)

*Primary Examiner*—Phirin Sam
(74) *Attorney, Agent, or Firm*—Workman Nydegger

(57) ABSTRACT

A mobile communications network and data delivery method in a mobile communications network is provided that can implement connectionless transfer in the mobile communications network, and obviate the need for sending a call control signal for data delivery. An IP address is assigned to each of the nodes of the mobile communications network including routing nodes (a gate node and repeater node, for example) and edge nodes and to each mobile station. A routing node, receiving data including the IP address of a mobile station, carries out routing of the data in accordance with routing information. The edge node that receives the data routed by the routing node, transmits the data to the mobile station corresponding to the IP address of the mobile station added to the data. The IP addresses are also applicable to delivering data to users of the same group, or carrying out control like handover.

22 Claims, 27 Drawing Sheets

U.S. PATENT DOCUMENTS

| | | | |
|---|---|---|---|
| 6,687,243 B1 * | 2/2004 | Sayers et al. | 370/356 |
| 6,687,252 B1 * | 2/2004 | Bertrand et al. | 370/401 |
| 2001/0038626 A1 * | 11/2001 | Dynarski et al. | 370/356 |
| 2002/0127995 A1 * | 9/2002 | Faccinn et al. | 455/406 |
| 2003/0039237 A1 * | 2/2003 | Forslow | 370/352 |

FOREIGN PATENT DOCUMENTS

| | | | |
|---|---|---|---|
| JP | 06-104926 | 4/1994 | H04L 12/56 |
| JP | 10242962 A | 9/1998 | H04L 12/18 |
| JP | 10308763 A | 11/1998 | H04L 12/46 |
| WO | WO 97/21313 | 6/1997 | H04Q 7/22 |
| WO | WO 98/19482 | 5/1998 | H04Q 7/22 |
| WO | WO 98/32304 | 7/1998 | H04Q 7/38 |

OTHER PUBLICATIONS

Official Notice of Rejection Patent Appl. No.: 2001-502389.

Danny Cohen et al.; "IP Addressing and Routing in a Local Wireless Network"; One World Through Communications. Florence, May 4-8, 1992, Proceedings of the Conference in Computer Communications (Infocom), New York IEEE, US, vol. 2 Cof. 11, May 4, 1992.

Charles E. Perkins; "Mobile-IP, Ad-Hoc Networking, and Nomadicity" Proceedings of the 20th Annual International Computer Software and Applications Conference (Compsac), Los Alamitos, IEEE Comp, vol. Cof. 20, Aug. 21, 1996.

* cited by examiner

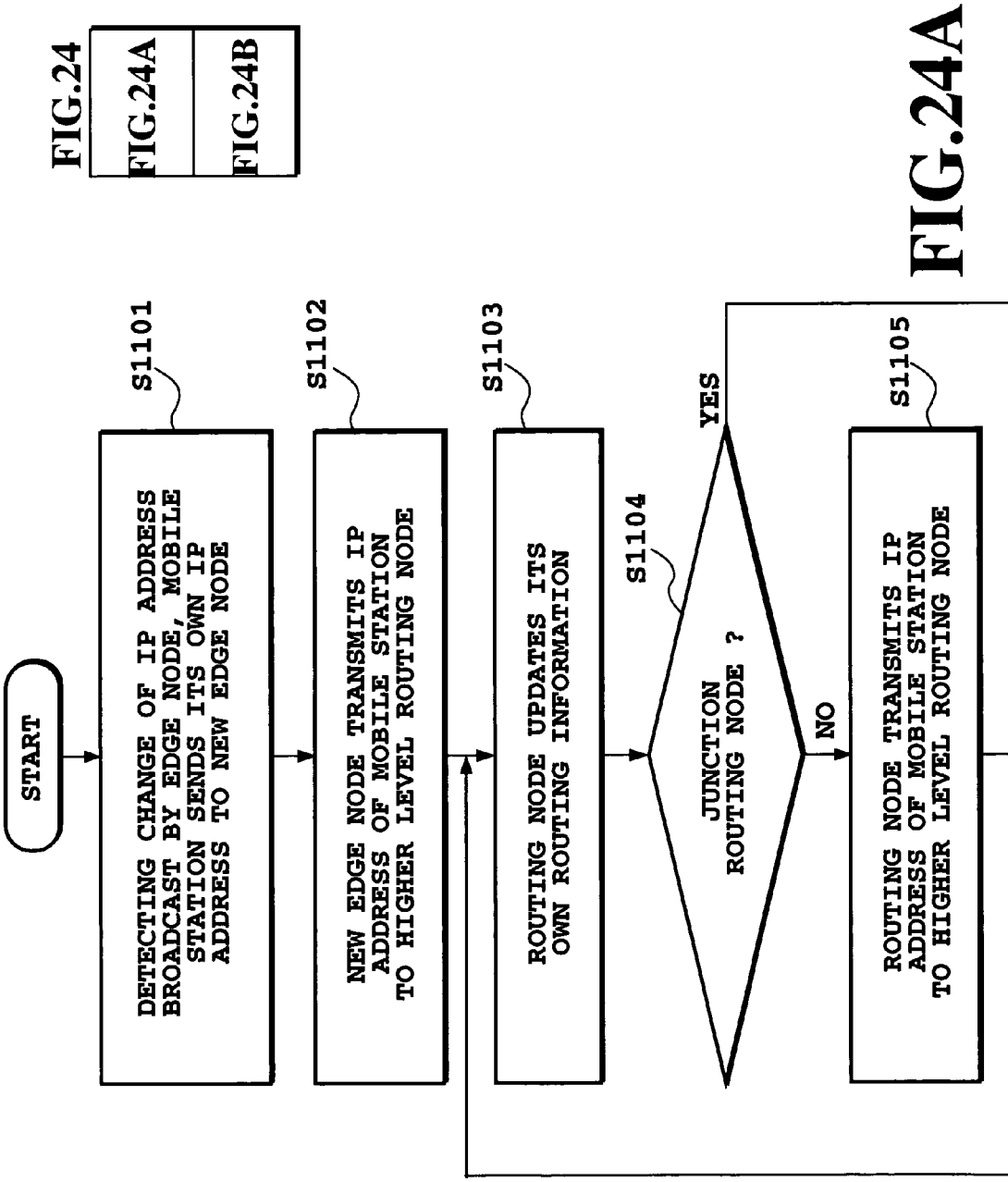

MOBILE COMMUNICATION NETWORK AND DATA DELIVERY METHOD IN MOBILE COMMUNICATIONS NETWORK

TECHNICAL FIELD

The present invention relates to a mobile communications network and a data delivery method in the mobile communications network.

BACKGROUND ART

Conventionally, to deliver (transmit) data from a server, or to transfer data between mobile stations in a mobile communications network, so-called connection-oriented transfer is carried out which searches for a location of a mobile station from its ID, and transfers a call control signal between nodes of the network, followed by the data delivery.

As for a plurality of users (mobile stations) belonging to the same group in an area supervised by the same edge node (for example, base station), the location of each user is identified by sending the call control signal, followed by the data delivery for each user.

Furthermore, although there is a so-called connectionless network that sends no call control signal at data transfer as is often seen in a normal fixed network Internet, there is no control (for example, handover control) applicable to such a case where the destination of the delivery moves incessantly.

Thus, the conventional data delivery method must transfer the call control signal between the nodes however small an amount of data to be delivered. As a result, it has problems of reducing node performance, requiring to develop complicated software, and increasing a system cost.

In addition, since it delivers data to user by user to deliver data to the users of the same group, it presents a problem of causing aggregation in the network, and increasing load of the data delivery server.

DISCLOSURE OF THE INVENTION

Therefore, an object of the present invention is to implement a connectionless network and connectionless transfer by assigning IP (Internet Protocol) addresses to individual nodes, location information servers, data delivery servers and mobile stations of a mobile communications network, and by carrying out data delivery using the IP addresses, thereby making it unnecessary to send the call control signal for the data delivery.

Another object of the present invention is to prevent aggregation of the network when delivering data to the users of the same group, thereby reducing the load of the data delivery server.

Still another object of the present invention is to implement control such as handover in a connectionless network by using the IP addresses.

In order to accomplish the above mentiond objects, according to the first aspect of the present invention, a mobile communications network of the present invention comprises: one or more routing nodes for receiving data to which the IP address of a mobile station is added, and for carrying out routing of the data in accordance with routing information; and one or more edge nodes for receiving the data routed by the routing nodes, and for transmitting the data to the mobile station corresponding to the IP address of the mobile station added to the data.

Here, the mobile communications network may further comprise a location information server for managing information about correspondence between the IP address of the mobile station and the IP address of the edge node that supervises the area visited by the mobile station, the routing nodes may include a gate node; the gate node may retrieve, by accessing the location information server, the IP address of the edge node supervising the area visited by the mobile station corresponding to the IP address of the mobile station added to the received data, and add the IP address of the edge node to the received data; the routing information may include information about correspondence between the IP address of the edge node and the transmission route; and the routing nodes may carry out the routing of the received data in accordance with the IP address of the edge node added to the received data and the routing information.

Here, when the mobile station moves from the supervisory area of an old edge node to the supervisory area of a new edge node, the moving mobile station may notify the location information server of its own IP address and the IP address of the new edge node; and the location information server may update information about correspondence between the IP address of the moving mobile station and the IP address of the edge node supervising the area visited by the moving mobile station.

Here, when the mobile station moves from the supervisory area of an old edge node to the supervisory area of a new edge node, the moving mobile station may transmit its own IP address and the IP address of the new edge node to the old edge node; and when the old edge node thereafter receives data to which the IP address of the moving mobile station is added, the old edge node may transmit the data to the new edge node with adding the IP address of the new edge node to the data.

Here, the routing information may include information about correspondence between the IP address of the mobile station and the transmission route, and the routing nodes may carry out the routing of the received data in accordance with the IP address of the mobile station added to the received data and the routing information.

Here, the IP address of a group of mobile stations can be added as the IP address of the mobile station to be added to the data, and the routing nodes may have group information which is information about correspondence between the IP addresses of the mobile stations belonging to the group and the IP address of the group of the mobile stations, replicate, when the IP address of the group of the mobile stations is added to the received data, the received data by the number of the transmission routes corresponding to the IP addresses of the mobile stations corresponding to the added IP address of the group of the mobile stations in accordance with the group information and the routing information and carry out the routing of the data.

Here, the IP address of the mobile station to be added to the data can include the IP addresses of a plurality of mobile stations, the routing nodes may replicate, when the IP addresses of the plurality of the mobile stations are added to the received data, the received data by the number of the transmission routes corresponding to the IP addresses of the plurality of the mobile stations in accordance with the routing information, add to each of the data, the IP addresses of the mobile stations corresponding to each of the transmission routes, and carry out the routing of the data.

Here, the mobile station, when it moves from the supervisory area of an old edge node to the supervisory area of a new edge node, may transmit its own IP address to the new edge node, and each node from the higher level routing node of the new edge node up to the junction routing node from which the transmission routes diverge to the old edge node and to the new edge node, may update its own routing information about the moving mobile station.

Here, the routing information may include information about correspondence between the IP address of the edge node and the transmission route, and the routing nodes may carry out the routing of the received data in accordance with the IP address of the edge node added to the received data and the routing information; and the mobile station may notify, when it moves from the supervisory area of an old edge node to the supervisory area of a new edge node, the old edge node of its own IP address and the IP address of the new edge node, and the old edge node may transmit, when it thereafter receives data to which the IP address of the moving mobile station is added, the data to the new edge node with adding the IP address of the new edge node to the data.

Here, the mobile communications network may further comprise a data delivery server for delivering data, the data delivery server may deliver data to the mobile station in response to a request from the mobile station.

Here, the mobile communications network may further comprises: a location information server for managing information about correspondence between the IP address of the mobile station and the IP address of the edge node that supervises the area visited by the mobile station, each of the edge nodes may receive data which is transmitted by a mobile station visiting its own supervisory area and to which the IP address of the mobile station is added, retrieve by accessing the location information server the IP address of the edge node supervising the area visited by the mobile station corresponding to the IP address of the mobile station added to the received data, add the IP address of the edge node to the received data, and transmit the data to the routing node; the routing information may include information about correspondence between the IP address of the edge node and the transmission route; and the routing nodes may carry out the routing of the received data in accordance with the IP address of the edge node added to the received data and the routing information.

Here, the edge node may generate and manage information about correspondence between the IP address of the mobile station added to the received data and the IP address of the edge node supervising the area visited by the mobile station.

Here, when the mobile station moves from the supervisory area of an old edge node to the supervisory area of a new edge node during communication with another mobile station, the moving mobile station may transmit its own IP address and the IP address of the new edge node to the edge node supervising the area visited by the party mobile station; and the edge node may update information about correspondence between the IP address of the moving mobile station and the IP address of the edge node supervising the area visited by the moving mobile station.

Here, when the mobile station moves from the supervisory area of an old edge node to the supervisory area of a new edge node, the moving mobile station may transmit its own IP address and the IP address of the new edge node to the old edge node; and when the old edge node thereafter receives data to which the IP address of the moving mobile station is added, the old edge node may transmit the data to the new edge node with adding the IP address of the new edge node to the data.

Here, when the mobile station moves from the supervisory area of an old edge node to the supervisory area of a new edge node, the moving mobile station may notify the location information server of its own IP address and the IP address of the new edge node; and the location information server may update information about correspondence between the IP address of the moving mobile station and the IP address of the edge node supervising the area visited by the moving mobile station.

Here, each of the edge nodes may receive data which is transmitted by a mobile station visiting its own supervisory area and to which the IP address of the mobile station is added, and transmit the data to the routing node; the routing information may include information about correspondence between the IP address of the mobile station and the transmission route; and the routing nodes may carry out the routing of the received data in accordance with the IP address of the mobile station added to the received data and the routing information.

Here, the mobile station, when it moves from the supervisory area of an old edge node to the supervisory area of a new edge node, may transmit its own IP address to the new edge node, and each node from the higher level routing node of the new edge node up to the junction routing node from which the transmission routes diverge to the old edge node and to the new edge node, and from the junction routing node to the higher routing node of the old edge is node, may update its own routing information about the moving mobile station.

Here, the routing information may include information about correspondence between the IP address of the edge node and the transmission route, and the routing nodes may carry out the routing of the received data in accordance with the IP address of the edge node added to the received data and the routing information; and the mobile station may notify, when it moves from the supervisory area of an old edge node to the supervisory area of a new edge node, the old edge node of its own IP address and the IP address of the new edge node, and the old edge node may transmit, when it thereafter receives data to which the IP address of the moving mobile station is added, the data to the new edge node with adding the IP address of the new edge node to the data.

According to the second aspect of the present invention, a data delivery method in a mobile communications network including one or more routing nodes and one or more edge nodes, the data delivery method of the present invention comprises the steps of: receiving, at one of the routing nodes, data to which the IP address of a mobile station is added, and carrying out routing of the data in accordance with routing information; and receiving, at one of the edge nodes, the data routed by the routing nodes, and transmitting the data to the mobile station corresponding to the IP address of the mobile station added to the data.

The foregoing configurations can implement the connectionless network and connectionless transfer with obviating the need for sending the call control signal for the data delivery in the mobile communications network.

In addition, they can prevent the network aggregation that can conventionally take place in the data delivery to users of the same group, thereby reducing the load of the data delivery server.

Furthermore, they can implement the control such as the handover in the connectionless network.

BRIEF DESCRIPTION OF THE DRAWINGS

FIG. 24 is a diagram showing a relationship between FIG. 24A and FIG. 24B;

FIGS. 24A and 24B are a flowchart illustrating the example of the first handover control in the mobile communications network of the fourth embodiment in accordance with the present invention;

BEST MODE FOR CARRYING OUT THE INVENTION

The best mode for carrying out the invention will now be described in detail.

First Embodiment

Figure 1:
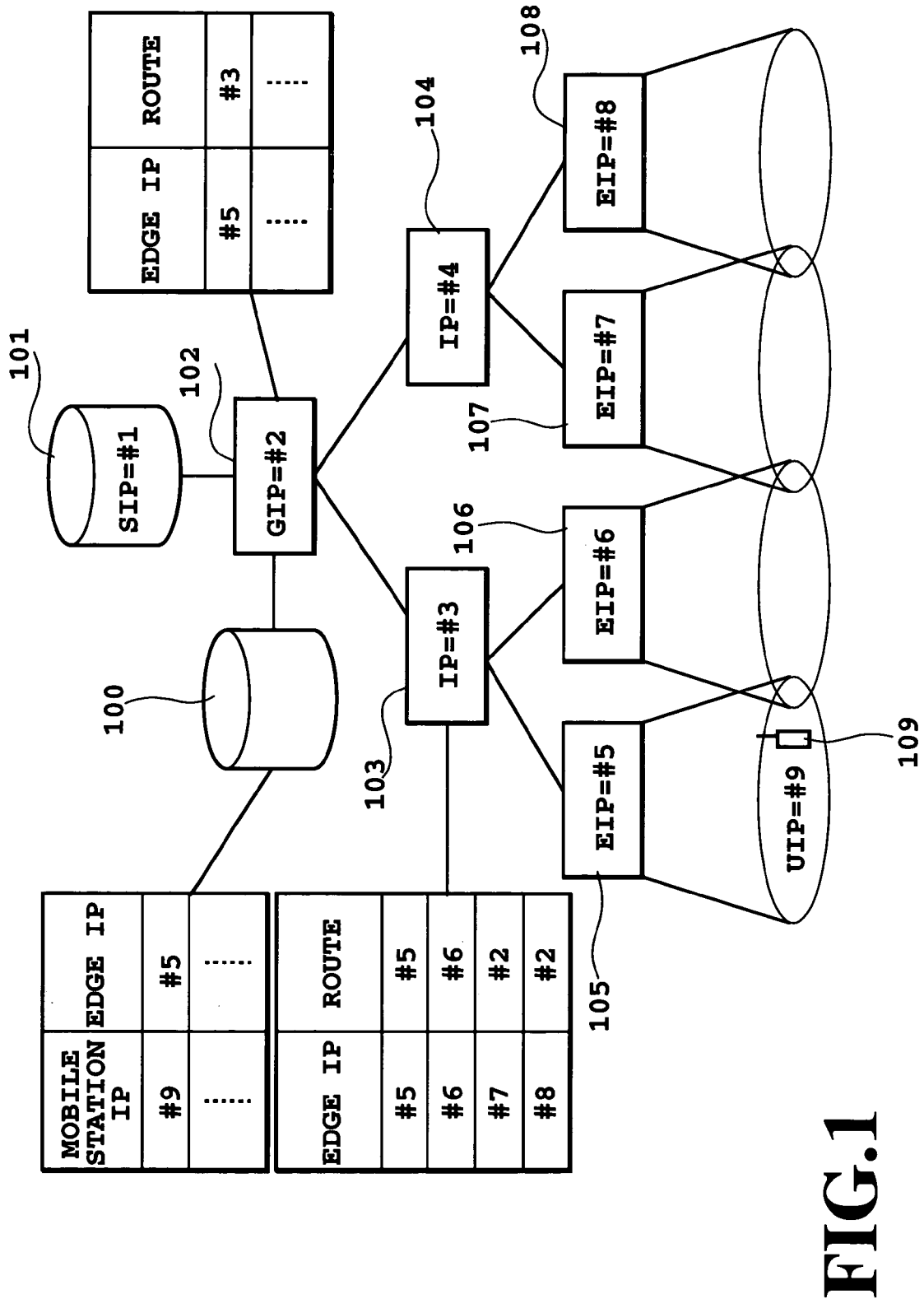
FIG. 1 is a block diagram showing a configuration of a mobile communications network of a first embodiment in accordance with the present invention.

FIG. 1 is a block diagram showing a configuration of a mobile communications network of the first embodiment in accordance with the present invention.

The mobile communications network of the present embodiment comprises a data delivery server 101, gate node 102, repeater nodes 103 and 104, edge nodes 105–108, and a location information server 100.

The data delivery server 101, gate node 102, repeater nodes 103 and 104, and edge nodes 105–108 have IP addresses (#1, #2, #3, #4, and #5 –#8, respectively, in the present embodiment), and a mobile station 109 also has an IP address (#9 in the present embodiment).

The gate node 102 and the repeater nodes 103 and 104 are routing nodes for carrying out data routing in accordance with routing information.

Figure 2:
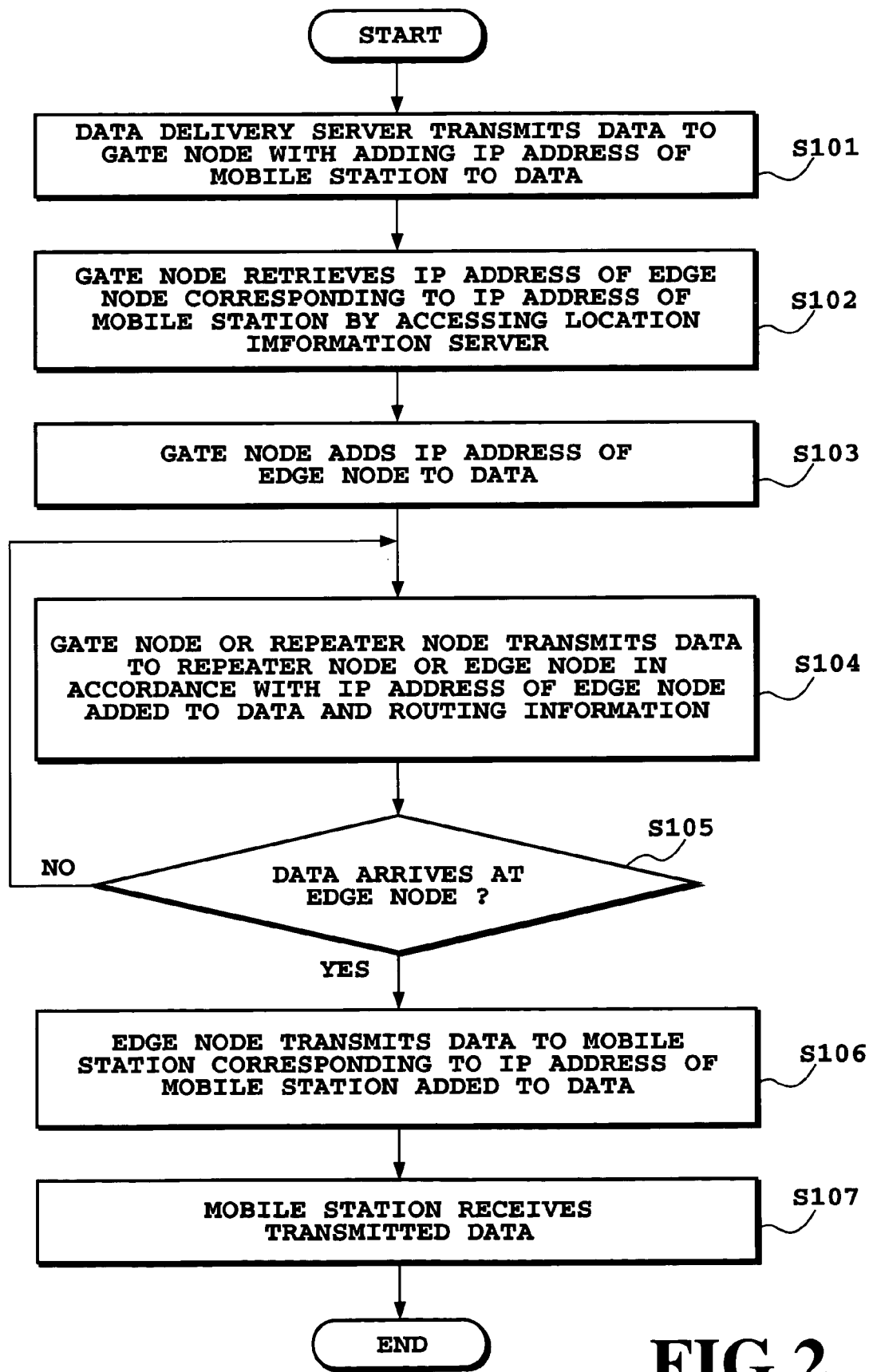
FIG. 2 is a flowchart illustrating an example of a data delivery method in the mobile communications network of the first embodiment in accordance with the present invention.

FIG. 2 is a flowchart illustrating an example of a data delivery method of the mobile communications network of the first embodiment in accordance with the present invention.

The data delivery server 101 manages the IP address of a mobile station to which data (IP packet) is to be delivered, and transmits the data along with the IP address of the mobile station to the gate node 102 (step S101).

The gate node 102 accesses the location information server 100 to capture the IP address of the edge node supervising the area visited by the mobile station corresponding to the IP address of the mobile station added to the received data (step 5102).

The location information server 100 manages the IP address of the edge node supervising the area visited by the mobile station corresponding to the IP address. As an example of the location information server 100, there is a home location register (HLR) or a visiting location register (VLR).

After capturing the IP address of the edge node by accessing the location information server 100, the gate node 102 adds the IP address of the edge node to the received data (step S103), that is, encapsulates the received IP packet for the mobile station into the IP packet for the edge node, and transmits it to the repeater node (step S104).

Incidentally, apart from the example of FIG. 1, it is also possible to configure the network in such a manner that the gate node is directly connected to the edge nodes without the repeater nodes. In this case, the gate node transmits the data directly to the edge nodes.

Figure 3:
FIG. 3 is a diagram showing an example of the format of an IP packet (data) transferred in a mobile communications network.

FIG. 3 is a diagram showing an example of a format of the IP packet (data) to be transferred in the mobile communications network. The IP packet shown in FIG. 3 is an IP packet associated with user information that includes the IP address of the edge node added thereto. In the format as shown FIG. 3, the reference symbol UD (User Data) designates data to be delivered, UIP (User IP) designates the IP address of the mobile station, and DGA (Destination Gatewaynode Address) designates the IP address of the edge node. The reference symbol UI (User Information) is an identifier indicating that the IP packet is the user information, which is added to distinguish it from an IP packet associated with control information. As for the IP packet associated with the control information, it includes an identifier indicating that the IP packet carries the control information. The UIP is added by the data delivery server 101, and the DGA is added by the gate node 102.

In the present embodiment, the gate node 102 records the correspondence between the IP address of the mobile station it captures by accessing the location information server and the IP address of the edge node so that the gate node utilizes the correspondence in the subsequent processing without accessing the location information is server 100. However, it is also possible for the gate node 102 to access the location information server 100 every time it receives the data to capture the correspondence without recording the correspondence.

The gate node 102 has routing information (routing table) that includes transmission route information about the IP address of the edge node. In the example as shown in FIG. 1, the gate node 102 has the routing information that the route for the edge node 105 with the IP address #5 is the repeater node 103 with the IP address #3. Accordingly, the gate node 102 that receives the data with the IP address of the edge node #5 transmits the data to the repeater node 103.

In accordance with the IP address of the edge node added to the received data, the repeater node 103 or 104 transmits the data to another repeater node or the edge node (edge node in the network configuration as shown in FIG. 1) (step S104). The repeater nodes 103 and 104 also have routing information that includes the transmission route information about the IP address of the edge node.

In the example as shown in FIG. 1, the repeater node 103 has the routing information that the route for the edge node 105 with the IP address #5 is the edge node 105 itself with the IP address #5 (in this case, the next transmission destination is the destination node itself).

Receiving the data (step S105), one of the edge nodes 105–108 transmits the data to the mobile station with the is IP address added to the received data. Specifically, it extracts the encapsulated IP packet for the mobile station, and transmits it to the mobile station (step S106). In the example as shown in FIG. 1, the edge node 105, receiving the data with the IP address #9 of the mobile station 109, transmits the data to the mobile station 109.

Thus, the mobile station 109 receives the data addressed to itself from the edge node (step S107).

The foregoing configuration and procedure can implement a connectionless network and connectionless transfer that obviate the need for sending the data call control signal for the delivery.

It is also possible to add the IP address of a group of mobile stations as the IP address of the mobile station to be added to the data (the IP address of the mobile station to receive the data delivery). In this case, the location information server 100, for example, manages the information (group information) of the IP address of the edge node supervising the area visited by the mobile stations which belong to the group corresponding to the IP address of the group of the mobile stations.

When the IP address of the group of the mobile stations is added to the received data, the gate node 102 accesses the location information server 100 to capture the IP addresses of the edge nodes supervising the areas visited by the mobile stations corresponding to the IP address, that is, the mobile stations which belong to the group.

When the mobile stations belonging to the group are spread over supervisory areas of a plurality of edge nodes, the gate node 102 captures a plurality of the IP addresses of the edge nodes. The gate node 102 replicates the received data by the number of (the IP addresses of) the edge nodes captured. It adds to each data the IP address of the edge node, and the IP addresses of the mobile station visiting the supervisory area of the edge node.

The edge node replicates the data by the number of the mobile stations and transmits them to the respective mobile stations. Alternatively, a particular group ID can be assigned to all the mobile stations belonging to the same group so that the edge node can broadcast the data with adding the group ID. Thus, only the mobile stations with the group ID (belonging to the group) can capture the data.

As for the participation of the mobile stations in the group, it can be either fixed or temporary. Alternatively, the location information server 100 can have its own IP address so that the users of the mobile stations can access the location information server 100 using the IP address to conduct group registration.

Thus, enabling addition of the IP address of the group of the mobile stations can obviate the need for delivering data to each mobile station, reducing the load of the data delivery server. Furthermore, transmitting the data on the edge node by edge node basis can prevent the network aggregation.

The data delivery server 101 can be designed such that it can deliver data to the mobile station 109 in response to its request. For example, the mobile station 109 transmits data to the data delivery server 101 with adding the IP address of the data delivery server 101 to the data including information about the data to be delivered and the IP address of the mobile station 109. Receiving the data, the data delivery server 101 transmits the requested data to the mobile station 109 with adding the IP address of the mobile station 109.

Figure 4:
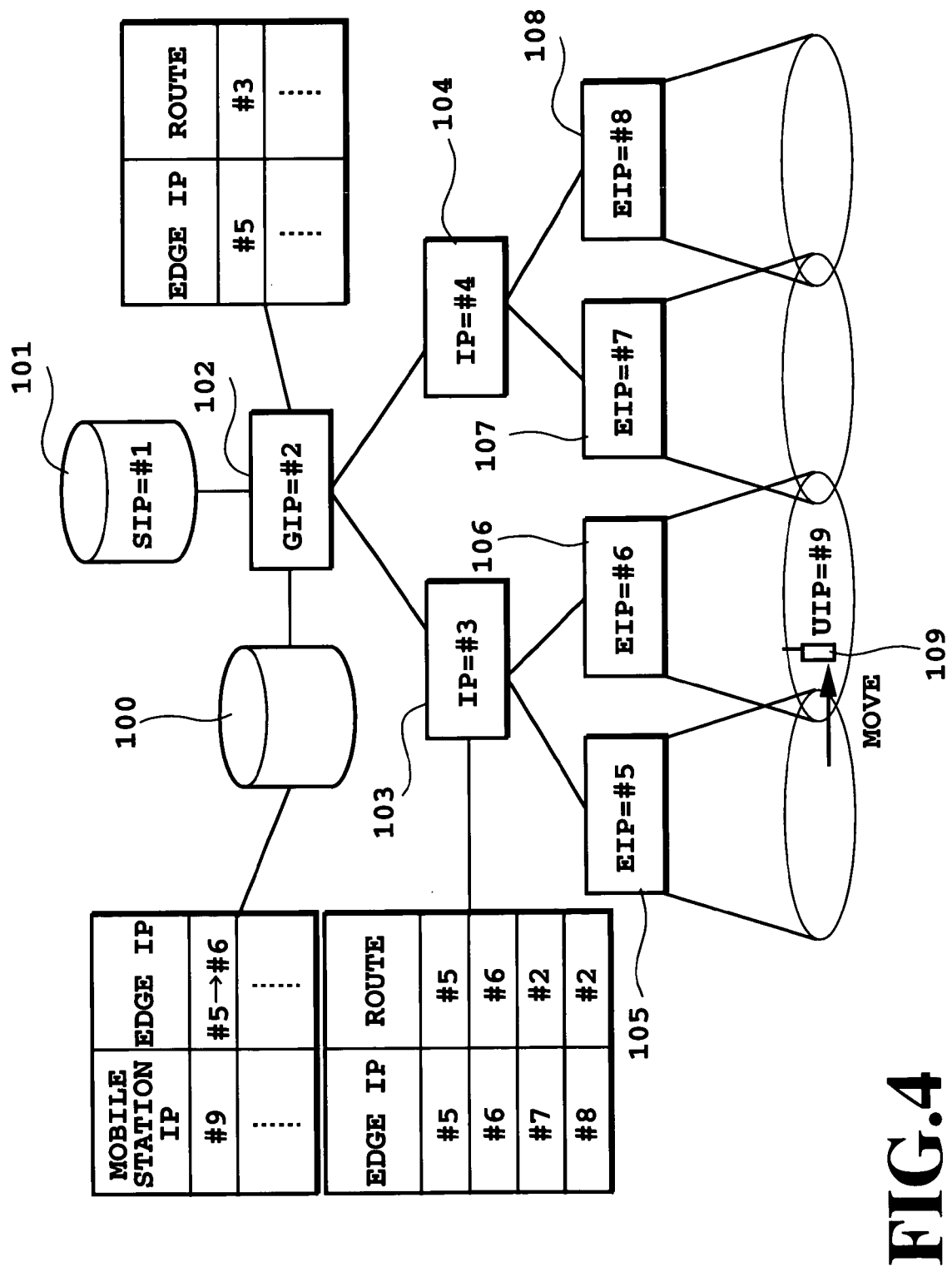
FIG. 4 is a block diagram illustrating an example of the first handover control in the mobile communications network of the first embodiment in accordance with the present invention.
Figure 5:
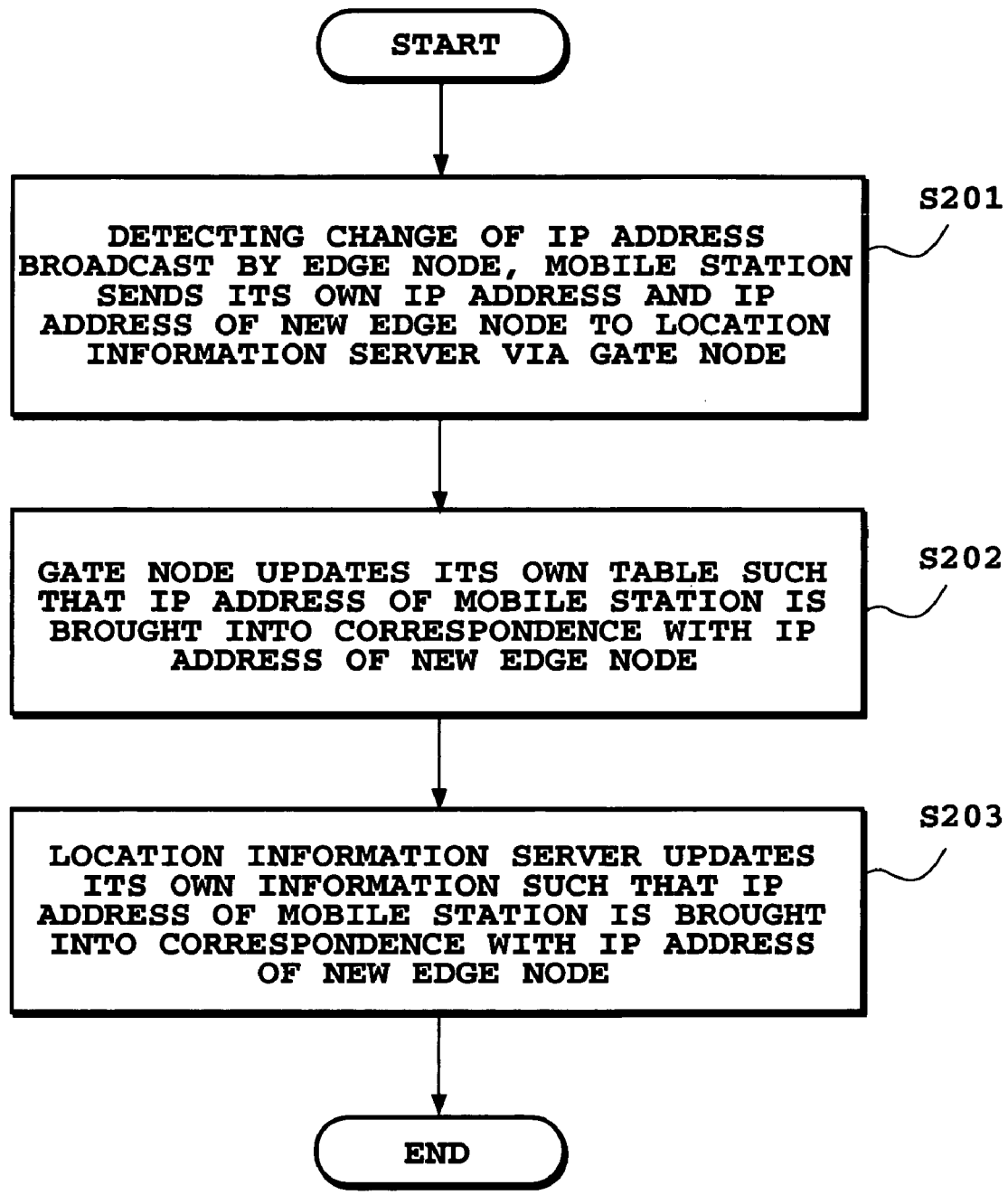
FIG. 5 is a flowchart illustrating the example of the first handover control in the mobile communications network of the first embodiment in accordance with the present invention.

FIG. 4 is a block diagram illustrating an example of the first handover control in the mobile communications network of the first embodiment in accordance with the present invention, and FIG. 5 is a flowchart illustrating the example of the first handover control in the mobile communications network of the first embodiment in accordance with the present invention. The handover control will be described by means of an example in which the mobile station 109 moves from the supervisory area of the edge node 105 to that of the edge node 106.

The edge nodes 105–108 each broadcast their own IP addresses to their supervisory areas. The mobile station 109 receives one of the IP addresses the edge nodes broadcast, and stores it.

When the broadcast IP address differs from the currently stored IP address, the mobile station 109 decides 315 that its visiting area changes, and notifies the location information server 100 of its own IP address and the IP address of the new edge node via the gate node 102 (step S201). In the example of FIG. 4, the mobile station 109 notifies the location information server 100 of its own IP address and the IP address of the edge node 106 via the edge node 106, repeater node 103 and gate node 102, for example.

If the gate node 102 has already established, in the form of table, for example, the relationship between the received IP address of the mobile station and the IP address of the edge node visited by the mobile station by having accessed the location information server 100, it updates the table to bring the IP address of the mobile station into correspondence with the received IP address of the new edge node (step S202). The location information server 100 also updates its information to bring the two IP addresses into correspondence (the update is carried out regardless of whether the gate node 102 has the table or not) (step S203).

In the example of FIG. 4, the IP address of the edge node the mobile station 109 visits is changed from #5 to #6. When the gate node 102 holds the relationship between the IP address of the mobile station and that of the edge node, it updates the relationship. After the update, the gate node 102 transmits the data to which the IP address #9 of the mobile station 109 is added after adding the IP address of the edge node #6 to the data.

In this way, the handover control is implemented in the connectionless network.

Figure 6:
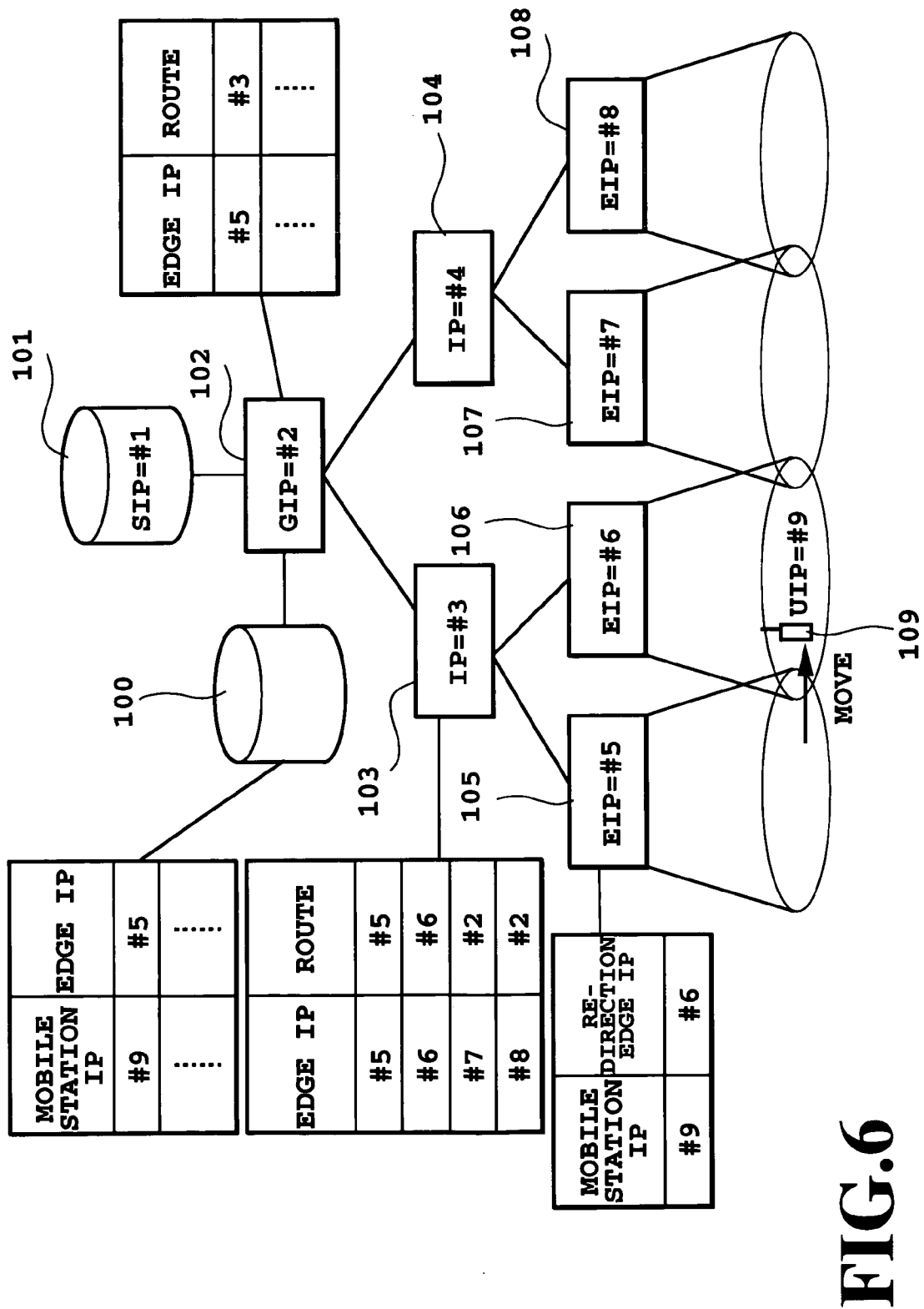
FIG. 6 is a block diagram illustrating an example of the second handover control in the mobile communications network of the first embodiment in accordance with the present invention.
Figure 7:
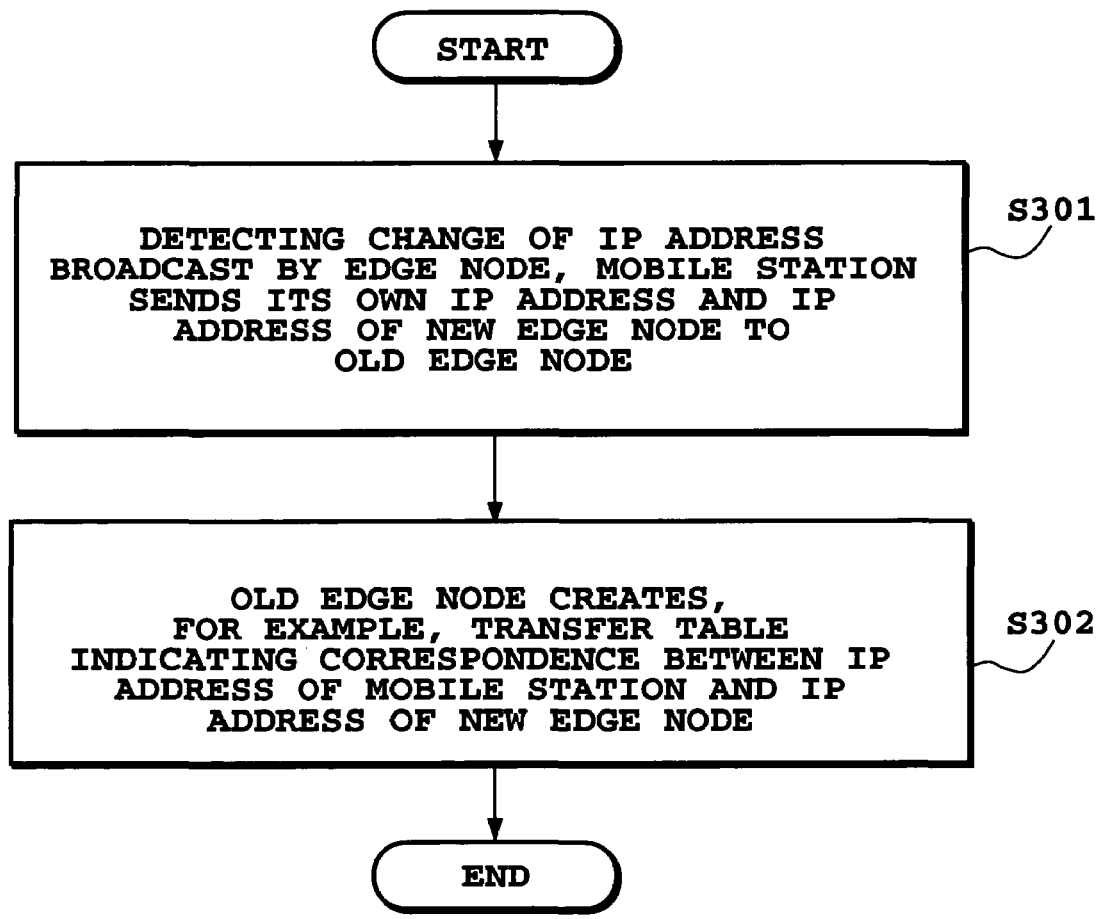
FIG. 7 is a flowchart illustrating the example of the second handover control in the mobile communications network of the first embodiment in accordance with the present invention.

FIG. 6 is a block diagram illustrating an example of the second handover control in the mobile communications network of the first embodiment in accordance with the present invention, and FIG. 7 is a flowchart illustrating the example of the second handover control in the mobile communications network of the first embodiment in accordance with the present invention. The handover control will be described by means of an example in which the mobile station 109 moves from the supervisory area of the edge node 105 to that of the edge node 106.

The edge nodes 105–108 each broadcast their own IP addresses to their supervisory areas. The mobile station 109 receives one of the IP addresses the edge nodes broadcast, and stores it.

Detecting that the broadcast IP address differs from the currently stored IP address, the mobile station 109 decides that its visiting area changes, and transmits its own IP address and the IP address of the new edge node to the old edge node (step S301). In the example of FIG. 6, the mobile station 109 transmits its own IP address #9 and the IP address #6 of the new edge node 106 to the edge node 105. The transmission to the edge node 105 is carried out via the edge node 106 and repeater node 103, for example.

The old edge node creates a transfer table establishing the relationship between the IP address of the mobile station and the IP address of the new edge node (redirection edge node) (S302) so that when the old edge thereafter receives data to which the IP address of the mobile station is added, it transmits (transfers) the data to the new edge node with adding the IP address of the new edge node to the data. In the example of FIG. 6, when receiving the data to which the IP address #9 of the mobile station 109 is added, the edge node 105 transmits the data to the edge node 106 with adding the IP address #6 of the edge node 106 to the data.

In this way, the handover control can be implemented in the connectionless network. Using the second handover control can reduce the data (packet) loss as compared with using the first handover control.

In the second handover control, however, there is a possibility of transmission delay or aggregation (aggregation between the edge node 105 and repeater node 103 of FIG. 6, for example) because the data is transferred from the first visiting edge node of the mobile station.

Therefore, it is possible to update the location information server 100 as in the first handover control at some opportunity.

As the opportunity for the update, it will be possible to utilize the end of the current communication, the elapse of a predetermined time period after the exhaustion of the data, and the like. It will also be possible to update is after a predetermined time period has elapsed from the start of the transfer to the new edge node by the old edge node. Alternatively, if the traffic of some edge node exceeds a threshold value, that edge node carries out the update associated with the IP address of the mobile station to which the edge node transfers.

The update of the location information server 100 is implemented when the old edge node transfers the IP address of the mobile station and that of the new edge node to the gate node 102. After transferring the IP addresses, the old edge node releases its own transfer table, which is preferably carried out after it receives the notification from the gate node 102 that the update of the location information server 100 is completed, to prevent data (packet) loss.

Second Embodiment

The second embodiment in accordance with the present invention carries out routing by the IP address of the mobile station.

Figure 8:
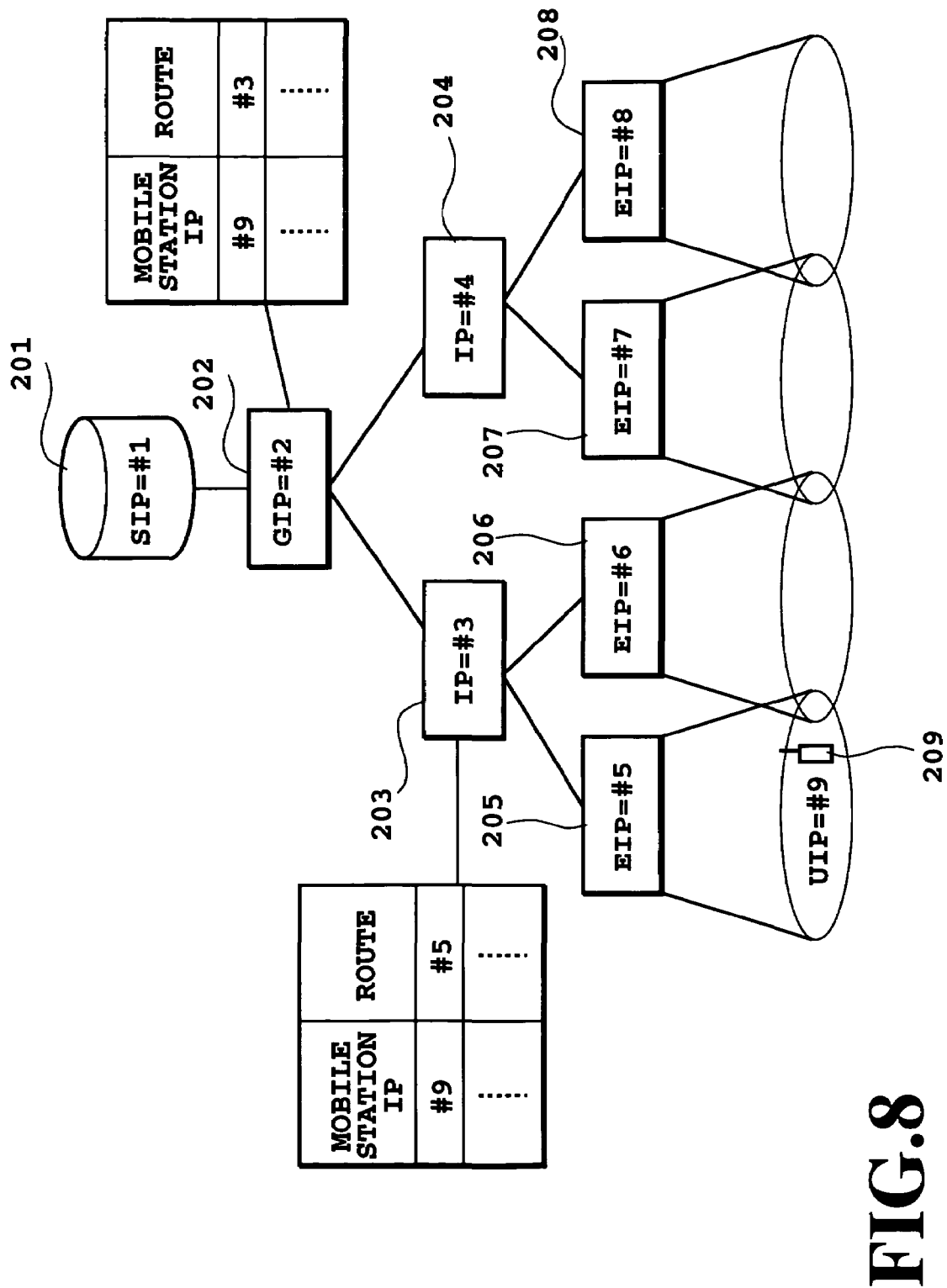
FIG. 8 is a block diagram showing a configuration of a mobile communications network of a second embodiment in accordance with the present invention.

FIG. 8 is a block diagram showing a configuration of a mobile communications network of the second embodiment in accordance with the present invention. It will now be described with placing emphasis on the difference from the mobile communications network of the first embodiment in accordance with the present invention.

The mobile communications network of the present embodiment comprises a data delivery server 201, a gate node 202, repeater nodes 203 and 204, and edge nodes 205–208, but not a location information server.

The data delivery server 201, gate node 202, repeater nodes 203 and 204 and edge nodes 205–208 have IP addresses (#1, #2, #3, #4 and #5 –#8 in the present embodiment), and a mobile station 209 has an IP address (#9 in the present embodiment).

The gate node 202 and repeater nodes 203 and 204 are a routing node that carries out data routing in accordance with the routing information.

Figure 9:
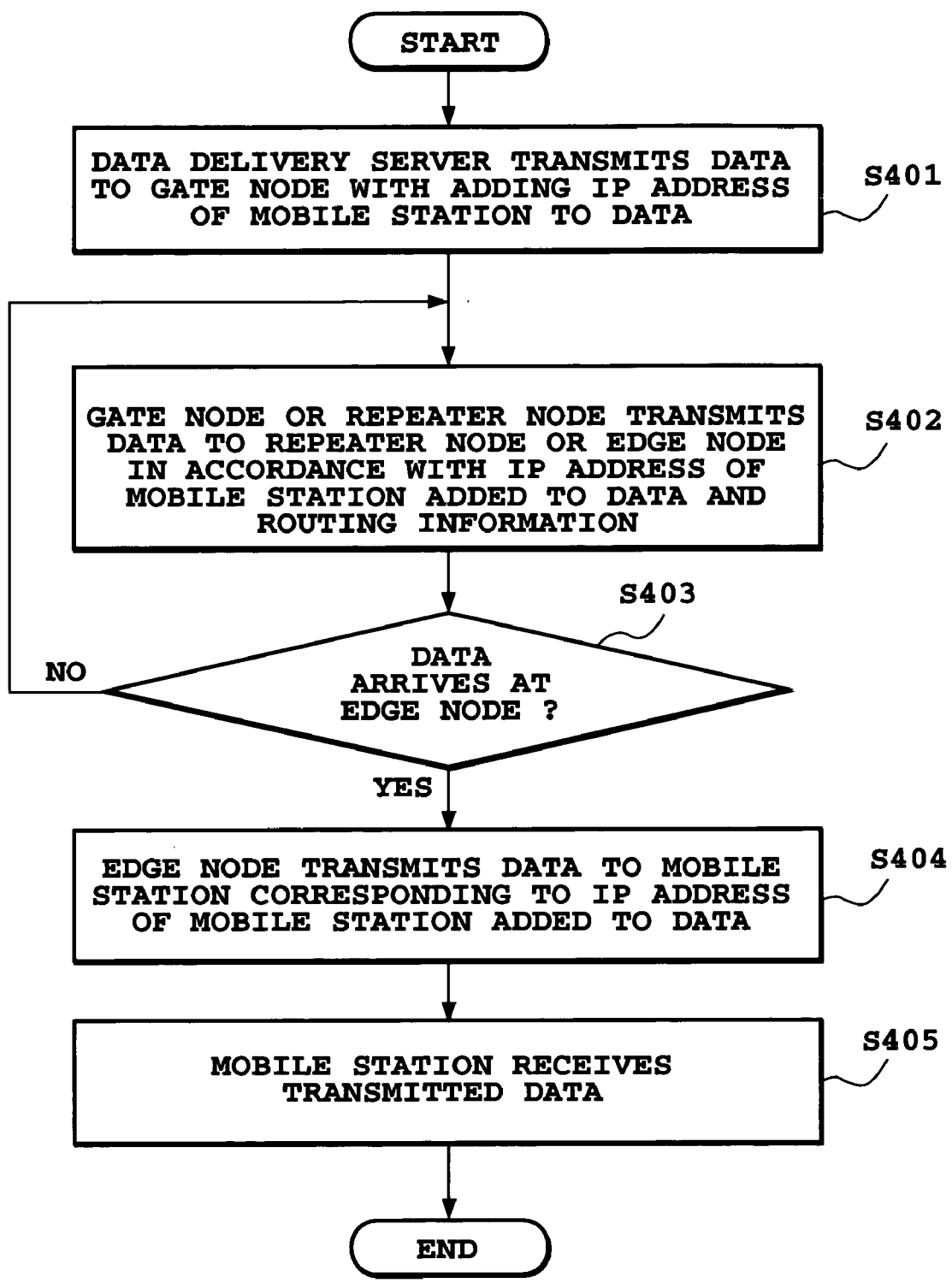
FIG. 9 is a flowchart illustrating an example of a data delivery method in the mobile communications network of the second embodiment in accordance with the present invention.

FIG. 9 is a flowchart illustrating an example of a data delivery method of the mobile communications network of the second embodiment in accordance with the present invention.

The data delivery server 201 manages the IP address of a target mobile station of the data (IP packet) delivery, and transmits the data to the gate node 202 with adding the IP address of the mobile station to the data (step S401) as in the first embodiment in accordance with the present invention.

The gate node 202 carries out the routing of the data in accordance with the IP address of the mobile station added to the received data (step S402). The gate node 202 possesses the routing information including transmission route information about the IP address of the mobile station. The gate node 202 has the transmission route information on all (IP addresses of) the mobile stations.

In the example of FIG. 8, the gate node 202 has routing information that a route for the edge node supervising the visiting area of the mobile station 209 with the IP address #9 is the repeater node 203 with the IP address #3. Therefore, when receiving data to which the IP address of the mobile station #9 is added, the gate node 202 transmits the data to the repeater node 203.

The present embodiment which carries out the routing according to the IP address of the mobile station differs from the first embodiment that carries out the routing according to the IP address of the edge node. Thus, the location information server is not needed.

The repeater node 203 or 204 also transmits the received data to another repeater node or edge node in accordance with the IP address of the mobile station added to the data (step S402). Both the repeater nodes 203 and 204 have the routing information that includes transmission route information about the IP address of the mobile station. The repeater nodes 203 and 204 have the transmission route information about the (IP addresses of the) mobile stations visiting the supervisory areas of the edge nodes under their control.

In the example of FIG. 8, the repeater node 203 has the routing information that the route for the edge node supervising the visiting area of the mobile station 209 with the IP address #9 is the edge node 205 with the IP address #5.

Receiving the data (step S403), one of the edge nodes 205–208 transmits the data to the mobile station with the IP address added to the received data (step S404), so that the mobile station 209 receives the data addressed and transmitted thereto from the edge node (step S405), as in the first embodiment in accordance with the present invention.

The foregoing configuration and procedure can implement the connectionless network and connectionless transfer that can obviate the need for sending the call control signal in the data delivery.

In the present embodiment, although the total amount of the routing information of the network increases as compared with that of the first embodiment in accordance with the present invention, it can eliminate the central management (location information server).

The IP address of a group of mobile stations can be added as the IP address of the mobile station to be added to the data.

In this case, the gate node 202 and the repeater nodes 203 and 204, for example, have information (group information) about the IP addresses of the edge nodes supervising the areas visited by the mobile stations which belong to the group with the IP address of the group.

When the IP address of the group of the mobile stations is added to the received data, the gate node 202 and repeater nodes 203 and 204 capture the IP addresses of the mobile stations corresponding to the IP address of the group in accordance with the group information, first. Subsequently, they capture transmission routes corresponding to the IP addresses of the mobile stations in accordance with the routing information. The gate node 202 and repeater nodes 203 and 204 replicate the received data by the number of the captured transmission routes, and transmit the data to the mobile stations. Since the IP address of the group of the mobile stations is added to the data, a similar processing is carried out at the next repeater node. The data is replicated by the number of the mobile stations by the edge nodes, and transmitted to the mobile stations.

As for the group information, the gate node 202 can transmit it along with the data, or can possess it in advance and notify the repeater nodes 203 and 204 of it by broadcasting. It is enough for the gate node 202 and repeater nodes 203 and 204 to have the group information at the time when carrying out the routing of the data to which the IP address of the group is added. Accordingly, it is possible to design such that the gate node 202 broadcasts the group information to the repeater nodes 203 and 204 every time it carries out the routing of the data to which the IP address of the group is added, and deletes the group information after the repeater nodes 203 and 204 each carry out the routing of the data.

Thus enabling the IP address of the group of the mobile, stations to be added can obviate the need for delivering the data to each of the mobile stations, thereby reducing the load of the data delivery server. In addition, since the data is replicated and transmitted only when necessary, the network aggregation can be prevented.

Furthermore, the IP addresses of a plurality of mobile stations can be added as the IP address of the mobile station to be added to the data.

When the IP addresses of a plurality of mobile stations are added to the received data, the gate node 202 and repeater nodes 203 and 204 capture transmission routes corresponding to the IP addresses of the mobile stations in accordance with the routing information. The gate node 202 and repeater nodes 203 and 204 replicate the received data by the number of the captured transmission routes, and add to each of the data the IP addresses of the mobile stations corresponding to each of the transmission routes. Then, they transmits the data to the mobile stations. The edge nodes replicate the data by the number of the mobile stations, and transmit them to the mobile stations.

Assume that the example of FIG. 8 has three mobile stations each of which visiting one of the supervisory areas of the edge nodes 205–207. Receiving the data to which the IP addresses of the three mobile stations are added, the gate node 202 generates two replicas of the data, and sends them to the repeater nodes 203 and 204. The repeater node 203 generates two replicas of the data, and transmits them to the edge nodes 205 and 206. On the other hand, the repeater node 204 transmits the data (without replicating the data) to the edge node 207.

In this way, enabling the plurality of the IP addresses of the mobile stations to be added can obviate the need for delivering the data to each of the mobile stations, thereby reducing the load of the data delivery server. In addition, since the data is replicated and transmitted only when necessary, the network aggregation can be prevented.

A configuration is also possible which enables the data delivery server 201 to deliver data to the mobile station 209 in response to a request from the mobile station 209 as in the first embodiment in accordance with the present invention.

Figure 10:
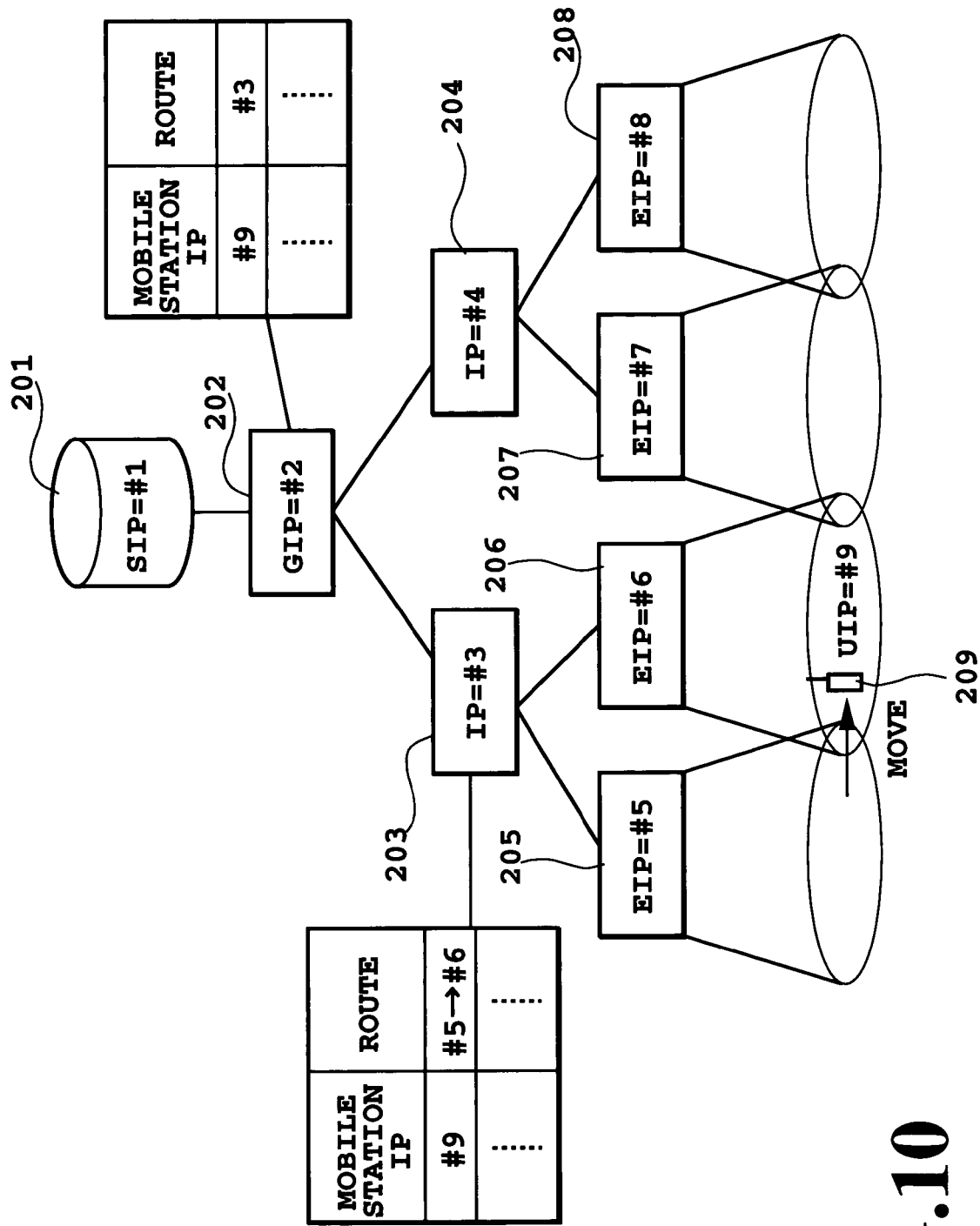
FIG. 10 is a block diagram illustrating an example of the first handover control in the mobile communications network of the second embodiment in accordance with the present invention.
Figure 11:
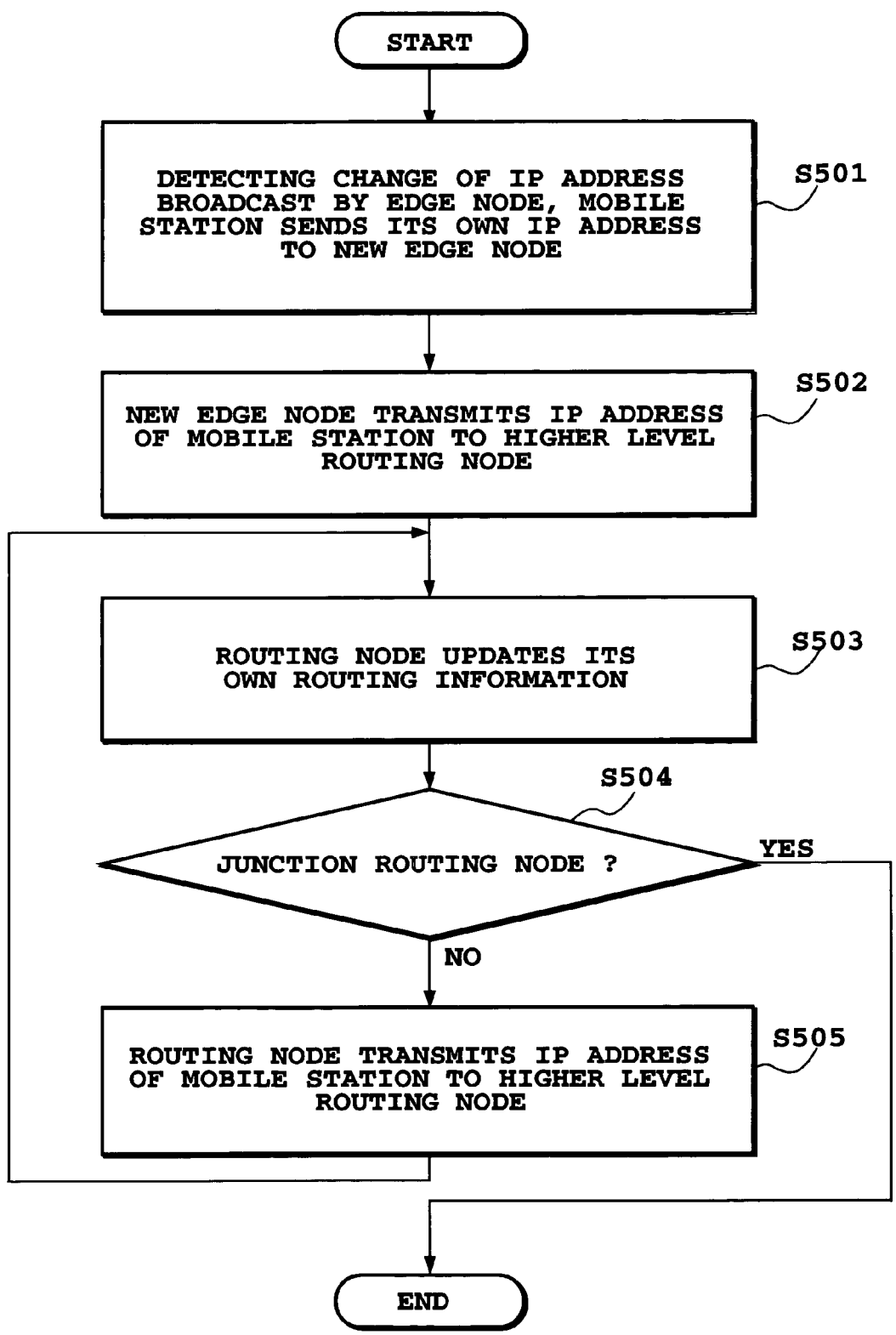
FIG. 11 is a flowchart illustrating the example of the first handover control in the mobile communications network of the second embodiment in accordance with the present invention.

FIG. 10 is a block diagram illustrating an example of the first handover control in the mobile communications network of the second embodiment in accordance with the present invention, and FIG. 11 is a flowchart illustrating the example of the first handover control in the mobile communications network of the second embodiment in accordance with the present invention. The handover control will be described by means of an example in which the mobile station 209 moves from the supervisory area of the edge node 205 to that of the edge node 206.

The edge nodes 205–208 each broadcast their own IP addresses to their supervisory areas. The mobile station 209 receives one of the IP addresses the edge nodes broadcast, and stores it.

Detecting that the broadcast IP address is different from the currently stored IP address, the mobile station 209 decides that its visiting area changes, and transmits its own IP address to the new edge node (step S501). In the example of FIG. 10, the mobile station 209 transmits its own IP address to the edge node 206.

The new edge node transmits the IP address of the moving mobile station to the higher level routing node (repeater node or gate node) (step S502). The routing node that receives the IP address of the mobile station updates its own routing information about the (IP address of the) mobile station (or creates new information when there is no information about the mobile station) (step S503). Subsequently, it transmits the IP address of the mobile station to a still higher level routing node. Such a processing is repeated up to the routing node from which two transmission routes diverge to the old edge node and to the new edge node (steps S504 and S505).

In the example of FIG. 10, the higher level routing node of the new edge node is the repeater node 203, and the routing node from which the transmission routes diverge into the old edge node (edge node 205) and the new edge node (edge node 206) is also the repeater node 203. Accordingly, the repeater node 203 updates the routing information about the (IP address of the) mobile station is 209, and changes the route from the edge node 205 (IP address #5) to the edge node 206(IP address #6).

Here, consider an example in which the mobile station 209 moves from the supervisory area of the edge node 206 to that of the edge node 207. In this case, the higher level routing node of the new edge node is the repeater node 204, and the routing node from which the transmission routes diverge into the old edge node (edge node 206) and the new edge node (edge node 207) is the gate node 202. Accordingly, the repeater node 204 and the gate node 202 update the routing information about the (IP address of the) mobile station 209.

To distinguish the junction routing node from which the transmission routes diverge into the old edge node and the new edge node, a method can be conceived in which routing is always carried out to the higher level routing node at the routing nodes other than the routing nodes on the transmission route from the highest level node (the gate node 202 in the example of FIG. 10) to the edge node supervising the area visited by the mobile station. Checking the routing information successively in ascending order from the higher level routing node of the new edge node, if the routing node has the routing information indicating a route to a lower level routing node, that routing node is identified as the junction node.

Likewise, a method can be conceived in which no routing information about the mobile station is provided to the routing nodes other than the routing nodes on the transmission route from the highest level node (the gate node 202 in the example of FIG. 10) to the edge node supervising the area visited by the mobile station. Checking the routing information in ascending order from the new edge node to the higher level routing node successively, if the routing node has the routing information about the moving mobile station, that routing node is identified as the junction node.

To apply the foregoing methods, after updating the routing information from the higher level routing node of the new edge node up to the junction routing node, the routing information about the moving mobile station is updated from the lower level routing node of the junction routing node down to the higher level routing node of the old edge node (updates the routing information such that data is transmitted to the higher level node, or eliminates the routing information). The signal for updating the routing information can be made and notified either by the junction routing node or by the new edge node.

Besides the foregoing methods, a method is possible in which tracing a route from the new edge node up to the highest level node, the routing nodes update the routing information about the moving mobile station so that the data addressed to the mobile station is transmitted from the highest level node to the new edge node.

The foregoing update methods of the routing information are applicable to the power up of the mobile station.

In this way, the handover control can be implemented in the connectionless network.

Figure 12:
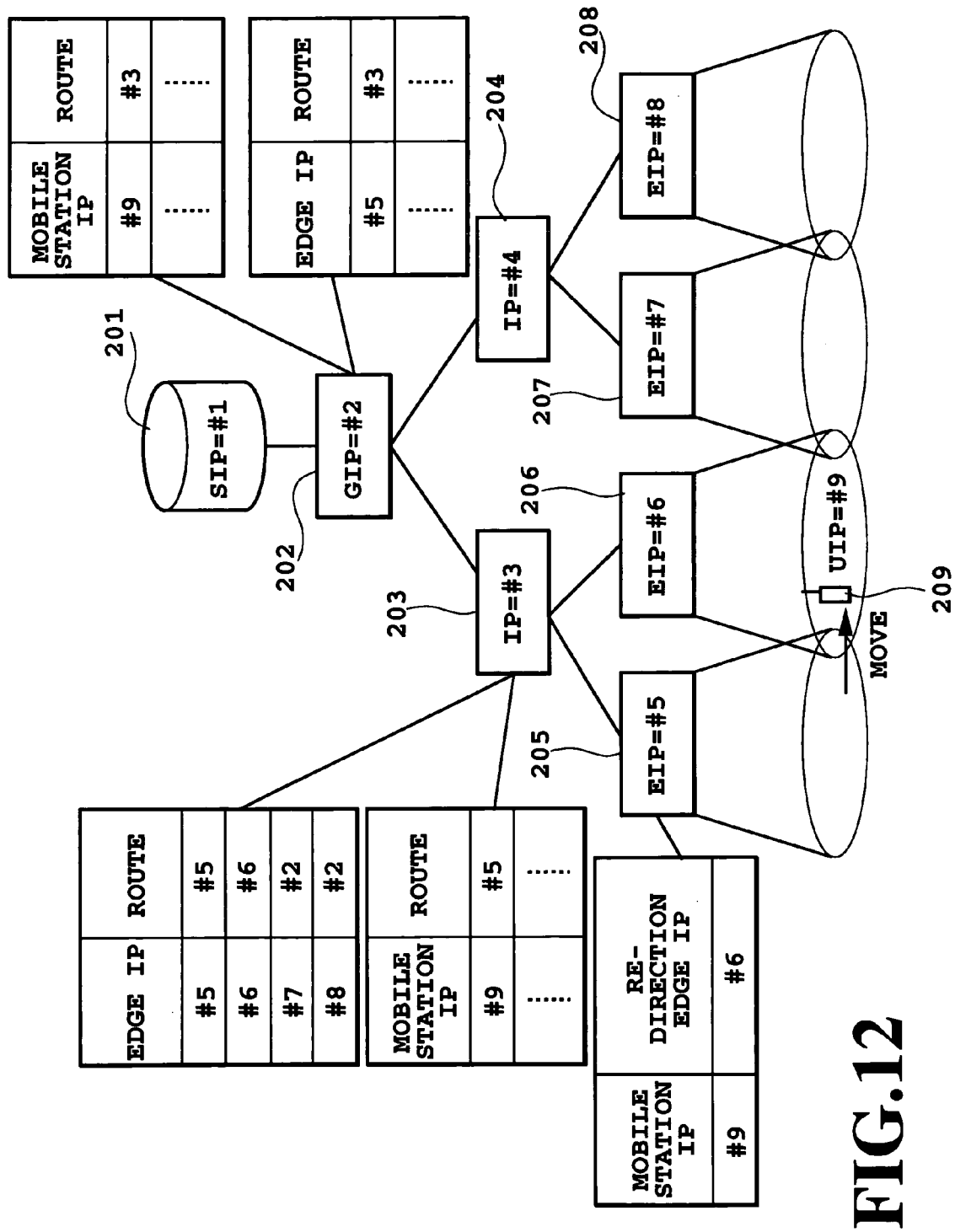
FIG. 12 is a block diagram illustrating an example of the second handover control in the mobile communications network of the second embodiment in accordance with the present invention.
Figure 13:
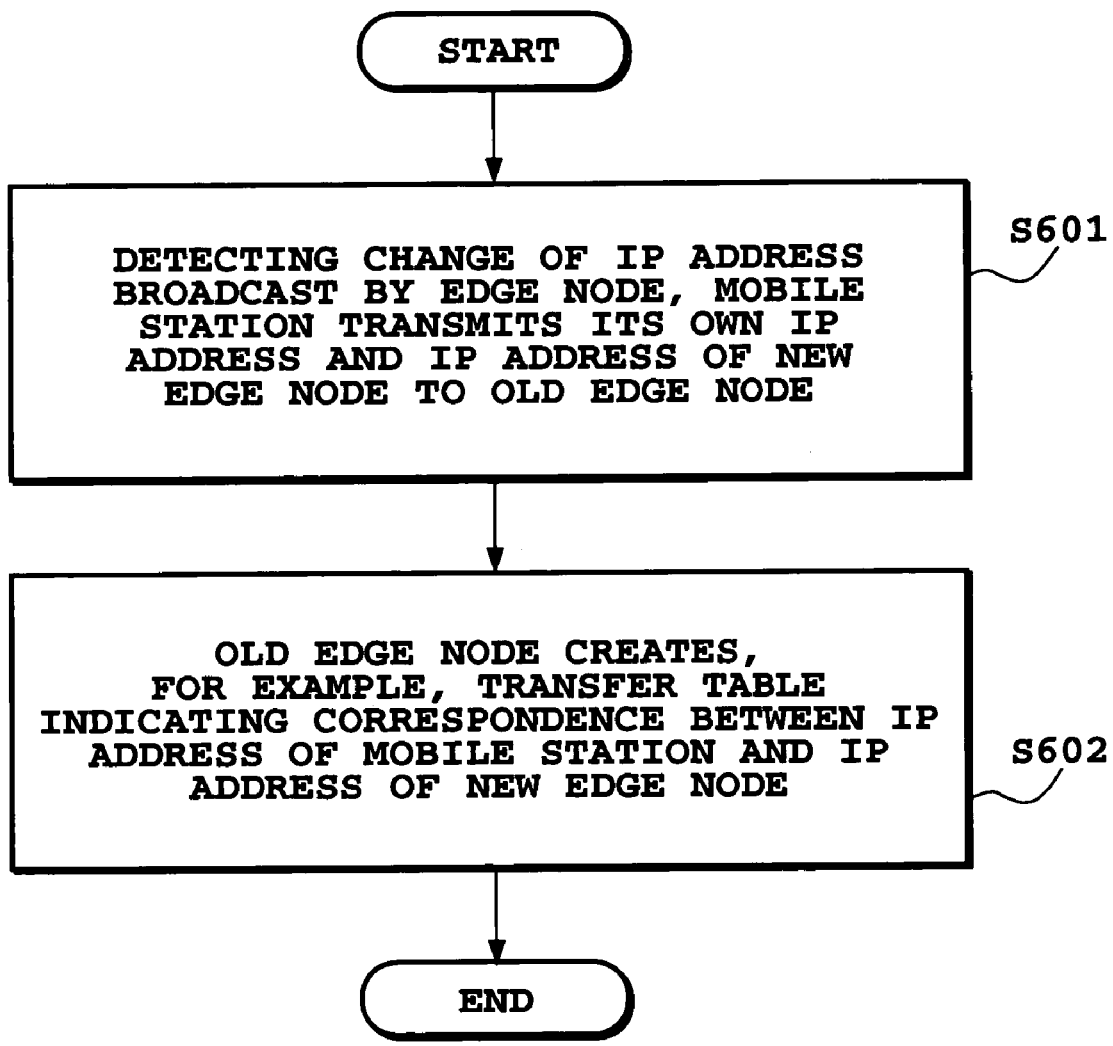
FIG. 13 is a flowchart illustrating the example of the second handover control in the mobile communications network of the second embodiment in accordance with the present invention.

FIG. 12 is a block diagram illustrating an example of the second handover control in the mobile communications network of the second embodiment in accordance with the present invention, and FIG. 13 is a flowchart illustrating the example of the second handover control in the mobile communications network of the second embodiment in accordance with the present invention. The handover control will be described by means of an example in which the mobile station 209 moves from the supervisory area of the edge node 205 to that of the edge node 206.

The edge nodes 205–208 each broadcast their own IP addresses to their supervisory areas. The mobile station 209 receives one of the IP addresses the edge nodes broadcast, and stores it.

Detecting that the broadcast IP address is different from the currently stored IP address, the mobile station 209 decides that its visiting area changes, and transmits its own IP address and the IP address of the new edge node to the old edge node (step S601). In the example of FIG. 12, the mobile station 209 transmits its own IP address #9 and the IP address #6 of the edge node 206 to the edge node 205. The transmission to the edge node 205 is carried out by placing information about correspondence between the IP address of the edge node and the transmission route into the routing information of each routing node as illustrated in FIG. 12, for example.

The old edge node creates a transfer table establishing the relationship between the IP address of the mobile station and the IP address of the new edge node (redirection edge node) (S602) so that when the old edge node thereafter receives data to which the IP address of the mobile station is added, it transmits (transfers) the data to the new edge node with adding the IP address of the new edge node to the data. In the example of FIG. 12, when receiving the data to which the IP address #9 of the mobile station 209 is added, the edge node 205 transmits the data to the edge node 206 with adding the IP address #6 of the edge node 206 to the data. Thus, the transmission to the new edge node 206 is carried out by placing the transmission route information about the IP address of the edge node into the routing information of the routing nodes as described above.

In this way, the handover control can be implemented in the connectionless network. Using the second handover control can reduce the data (packet) loss as compared with using the first handover control.

In the second handover control, however, there is a possibility of transmission delay or aggregation (aggregation between the edge node 205 and repeater node 203 of FIG. 12, for example) because the data is transferred from the first visiting edge node of the mobile station. Therefore, it is possible to update the routing information of the repeater node as in the first handover control at some opportunity.

As for the opportunity for the update, it is analogous to that of the first embodiment in accordance with the present invention.

The update of the routing information is implemented from the higher level routing node of the new edge node to the junction node as in the first handover control, for example. The release of the transfer table of the old edge node is preferably carried out after the update of the routing information of the junction node to prevent the data (packet) loss.

As described above, the second embodiment in accordance with the present invention can obviate the need for the location information server. In other words, it is possible for the network to carry out the data delivery, handover control and the like in the mobile communications without installing the location information server such as HLV and VLR for registering locations of users.

Embodiment 3

The third embodiment in accordance with the present invention implements data transfer between mobile stations. The routing is carried out using the IP addresses of the edge nodes as in the first embodiment.

Figure 14:
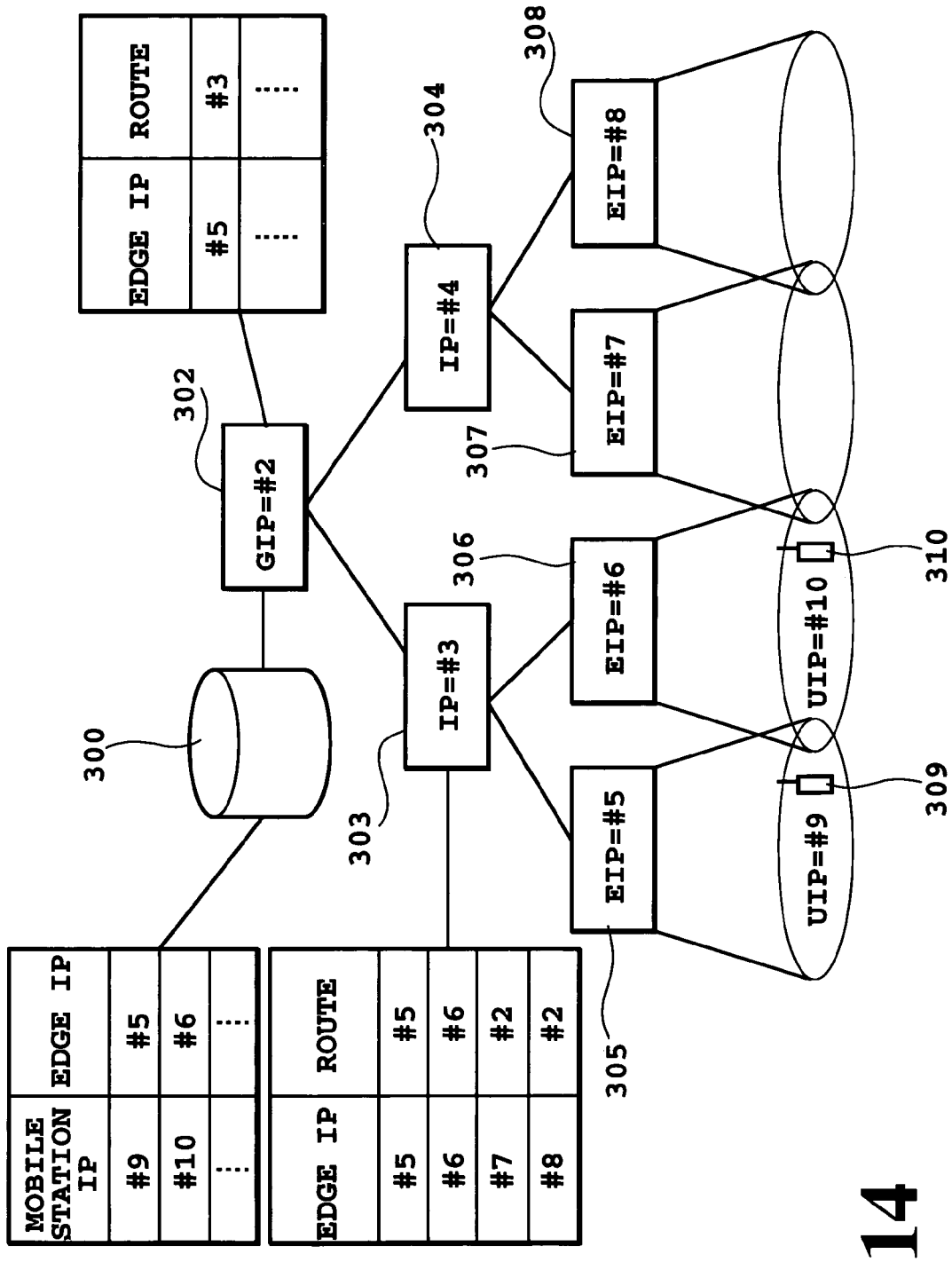
FIG. 14 is a block diagram showing a configuration of a mobile communications network of a third embodiment in accordance with the present invention.

FIG. 14 is a block diagram showing a configuration of a mobile communications network of the third embodiment in accordance with the present invention.

The mobile communications network of the present embodiment comprises a gate node 302, repeater nodes 303 and 304, edge nodes 305–308, and a location information server 300. The functions of the nodes and the server are the same as those of their counterparts in the first embodiment.

The gate node 302, repeater nodes 303 and 304, and edge nodes 305–308 have their own IP addresses (#2, #3, #4, and #5–#8, respectively, in the present embodiment), and mobile stations 309 and 310 also have their own IP addresses (#9 and #10 in the present embodiment).

The gate node 302 and the repeater nodes 303 and 304 are a routing node for carrying out routing of the data in accordance with routing information.

Figure 15:
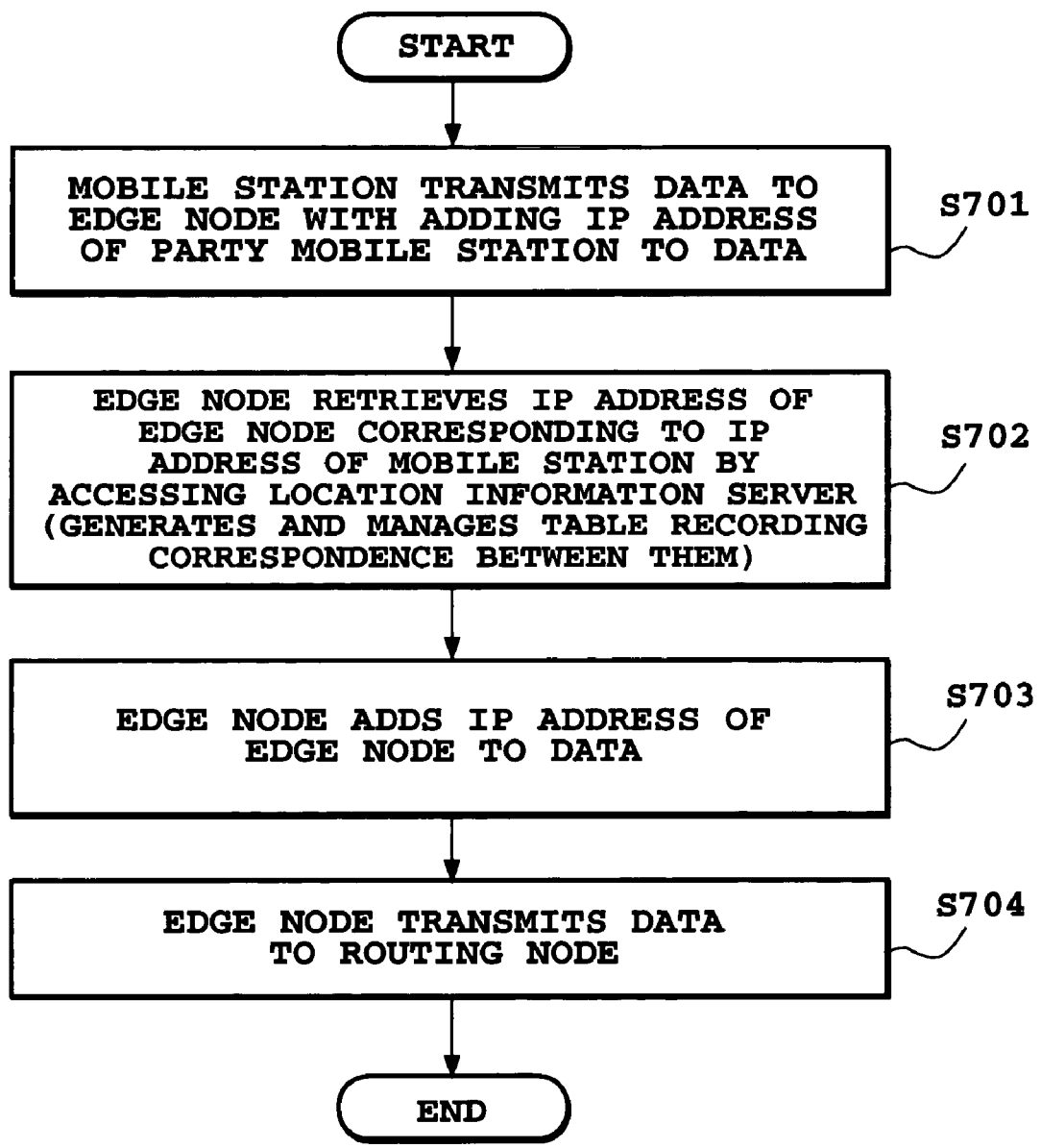
FIG. 15 is a flowchart illustrating an example of a data transfer method between mobile stations in the mobile communications network of the third embodiment in accordance with the present invention.

FIG. 15 is a flowchart illustrating part of a data transfer method between mobile stations in the mobile communications network of the third embodiment in accordance with the present invention.

Assume that a mobile station (309, for example) transmits data (IP packet) with adding the IP address (#10) of a party mobile station (310, for example) to the edge node (305, in this case) (step S701).

The edge node accesses the location information server 300 to retrieve the IP address of the edge node supervising the area visited by the mobile station corresponding to the IP address of the mobile station added to the received data (S702). In the present embodiment, the edge node generates information (table) about the retrieved relationship and manages it. After that, there is no need to access the location information server 300, though it is also possible to design to access the location information server 300 every time the packet is received (in which case, the table is not needed). Alternatively, it is also possible to design to access the location information server 300 periodically to update the table (in which case, the load of the location information server 300 is reduced as compared with the case that accesses it for each packet).

After retrieving the IP address of the edge node by accessing the location information server 300, the edge node adds the IP address of the edge node to the received data (S703), that is, encapsulates the received IP packet for the mobile station into the IP packet for the edge node, and transmits it to the routing node (S704).

In the example of FIG. 14, since each edge node is connected with only one repeater node, the data is transmitted to the corresponding one of the repeater nodes.

The edge node, however, can be connected to a plurality of repeater nodes, in which case, the edge node carries out routing in accordance with the IP address of the destination edge node of the data. The subsequent routing of the data is analogous to that of the first embodiment. For example, the data transmitted from the mobile station 309 to the mobile station 310 is transmitted through the edge node 305, repeater node 303 and edge node 306, and arrives at the mobile station 310. The data transmission from the mobile station 310 to the mobile station 309 is carried out in a similar manner.

Figure 16:
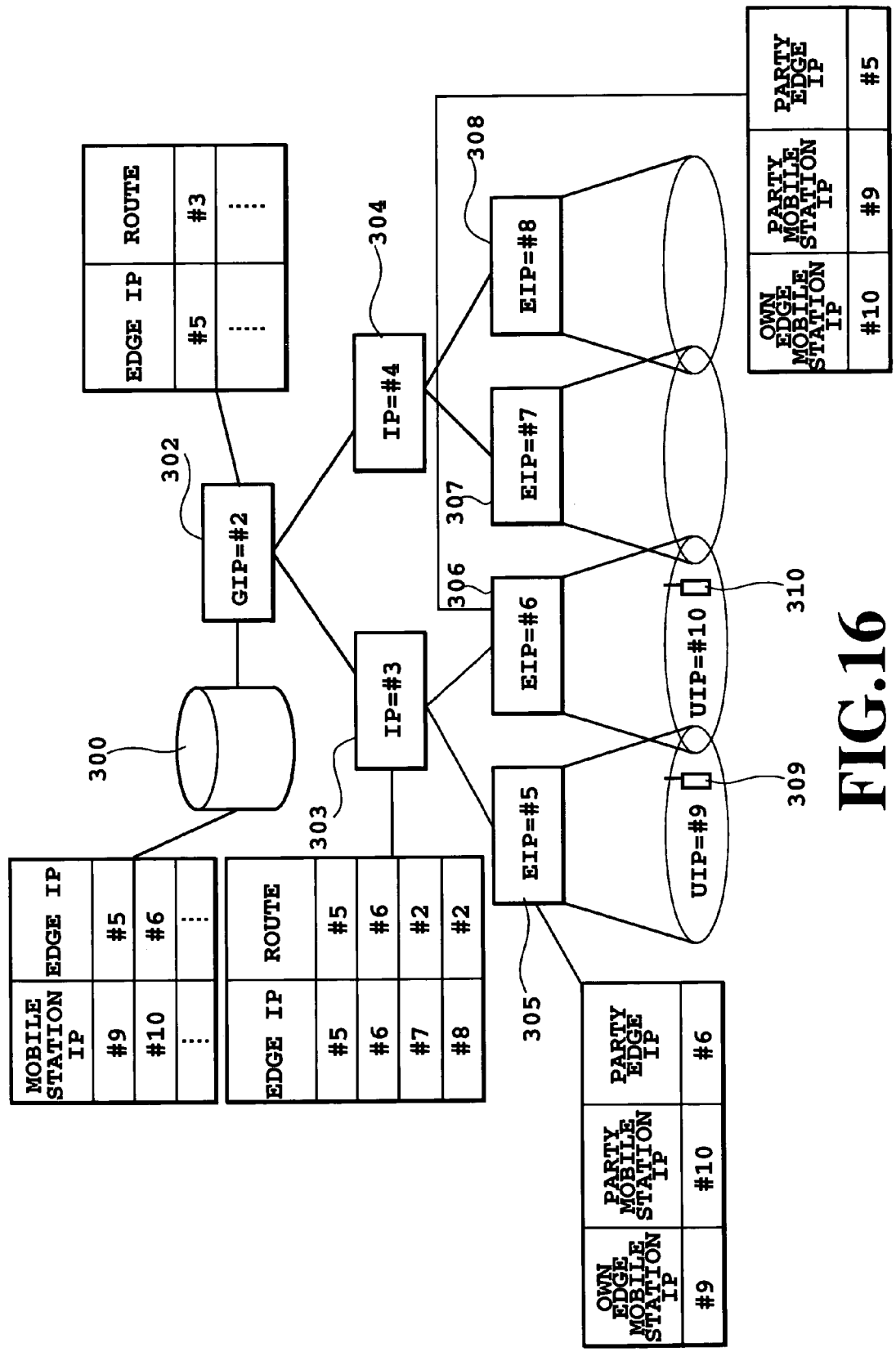
FIG. 16 is a block diagram showing tables generated and managed by edge nodes of the mobile communications network of the third embodiment in accordance with the present invention.

FIG. 16 is a block diagram showing an example of the table the edge node generates and manages in the mobile communications network of the third embodiment in accordance with the present invention. The edge node 305, receiving the data for the mobile station 310 from the mobile station 309, identifies that the edge node of the mobile station 310 is the edge node 306, and generates and manages the table as shown in FIG. 16. Likewise, the edge node 306, receiving the data for the mobile station 309 from the mobile station 310, identifies that the edge node of the mobile station 309 is the edge node 305, and generates and manages the table as shown in FIG. 16.

Figure 17:
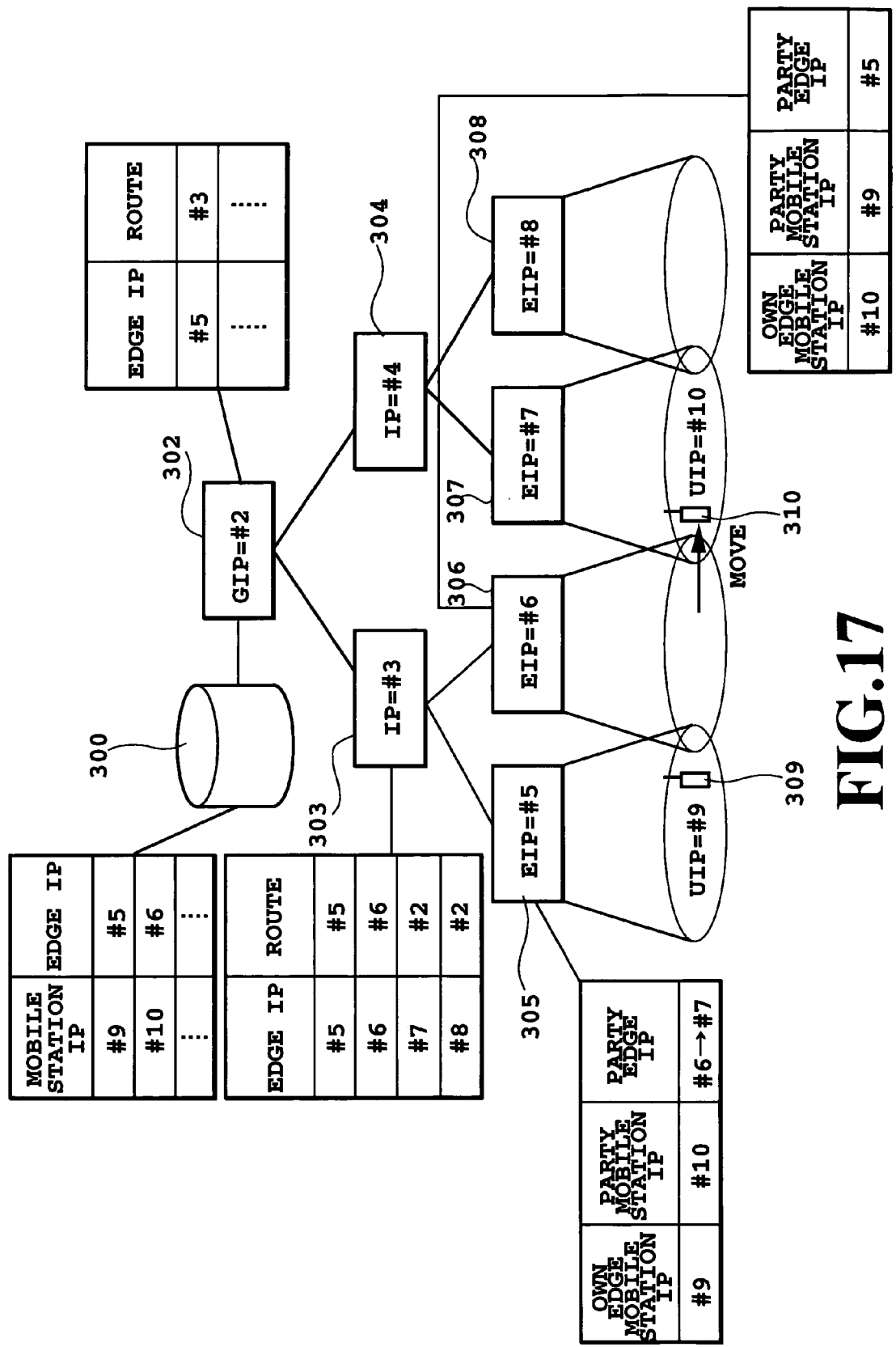
FIG. 17 is a block diagram illustrating an example of the first handover control in the mobile communications network of the third embodiment in accordance with the present invention.
Figure 18:
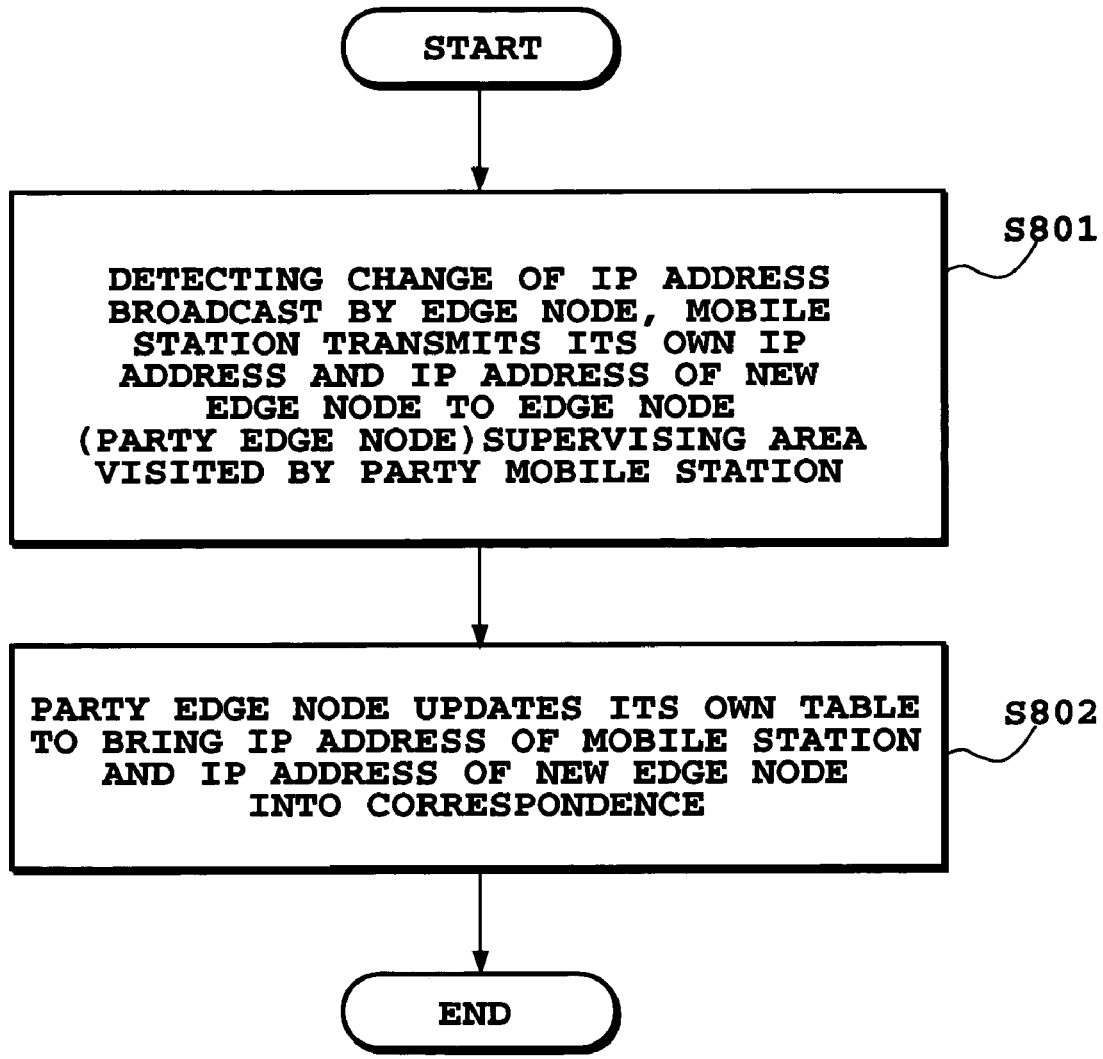
FIG. 18 is a flowchart illustrating the example of the first handover control in the mobile communications network of the third embodiment in accordance with the present invention.

FIG. 17 is a block diagram illustrating an example of the first handover control in the mobile communications network of the third embodiment in accordance with the present invention, and FIG. 18 is a flowchart illustrating the example of the first handover control in the mobile communications network of the third embodiment in accordance with the present invention. The handover control will be described by means of an example in which the mobile station 310 moves from the supervisory area of the edge node 306 to that of the edge node 307.

Detecting that the broadcast IP address is different from the currently stored IP address, the mobile station 310 decides that its visiting area changes, and transmits its own IP address and the IP address of the new edge node to the edge node (party edge node, in this case the edge node 305) supervising the visiting area of the party mobile station (mobile station 309) (S801).

A few methods are conceivable of transmitting the newly corresponding two IP addresses (the IP address of the mobile station 310 and the IP address of the edge node 307) to the party edge node. For example, there is a method in which the moving mobile station 310 notifies the new edge node 307 of the IP address of the party mobile station 309, so that the edge node 307 accesses the location information server 300 to retrieve the edge node (edge node 305) of the mobile station 309, and transmits the newly corresponding two IP addresses to the edge node 305.

Alternatively, the moving mobile station 310 notifies the new edge node 307 that the old edge node is the edge node 306, so that the new edge node 307 transmits the newly corresponding two IP addresses to the old edge node 306, and the edge node 306 transmits the newly corresponding two IP addresses to the edge node 305 (the old edge node 306 knows from its own table that the mobile station 310 is communicating with the mobile station 309, and that the edge node of the mobile station 309 is the edge node 305). Using the method enables the edge node 306 to eliminate the table about the mobile station 310, which becomes unnecessary.

There is still another method in which in the foregoing two methods, the edge node 307 or edge node 306 notifies the location information server 300 to update the information about the mobile station 310 (notifies it of the newly corresponding two IP addresses), so that the location information server 300 notifies the edge node 305 to update the information (table) about the mobile station 310 (notifies it of the newly corresponding two IP addresses).

The edge node 305 updates its own table in accordance with the received newly corresponding two IP addresses such that the IP address of the mobile station 310 corresponds to the IP address of the edge node 307 (S802).

In the example of FIG. 17, the edge node 305 changes in its own table the IP address of the edge node the mobile station 310 visits from #6 to #7. After that, the edge node 305 transmits the data to which the IP address #10 of the mobile station 310 is added with adding the IP address #7 of the edge node 307 to the data.

Figure 19:
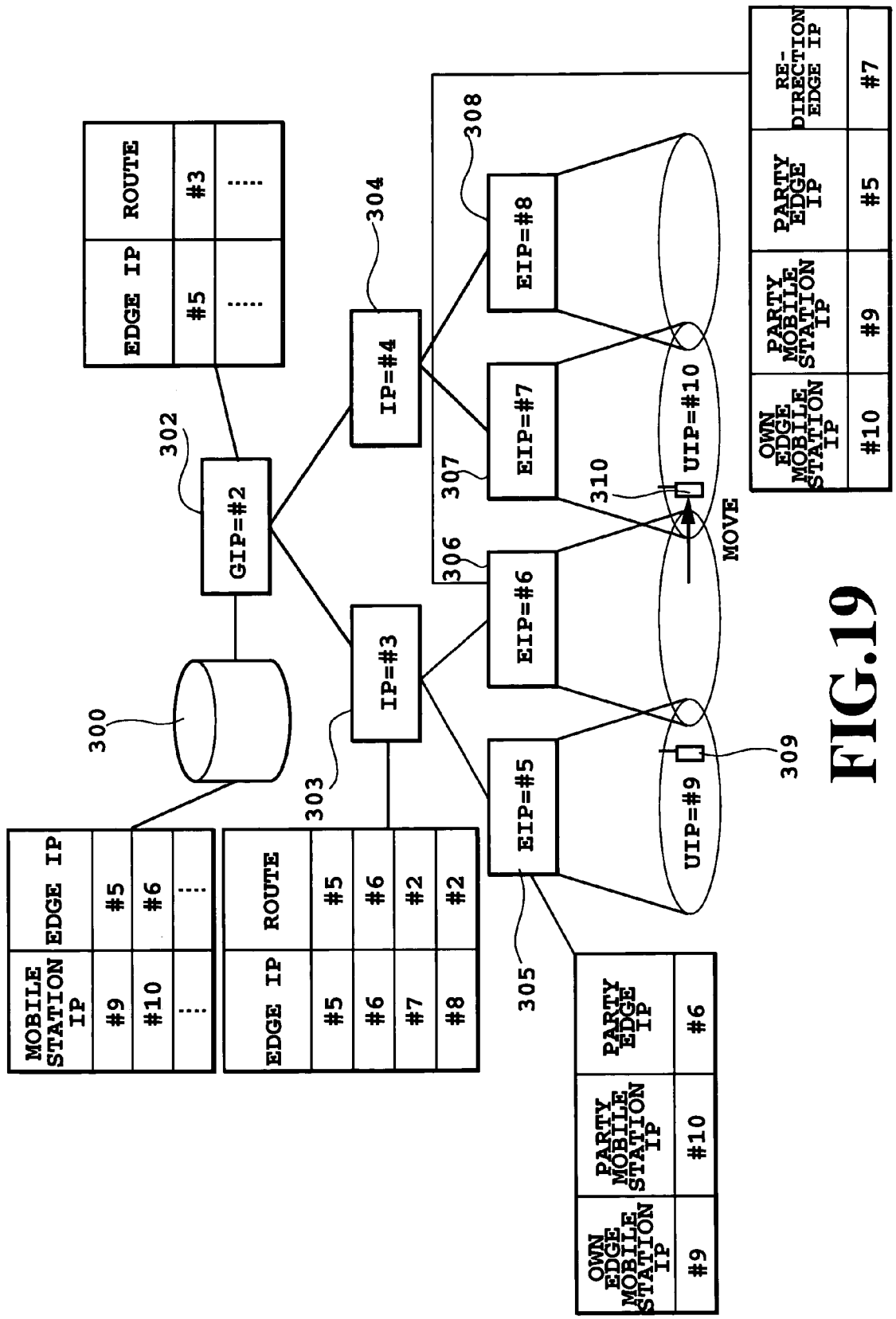
FIG. 19 is a block diagram illustrating an example of the second handover control in the mobile communications network of the third embodiment in accordance with the present invention.
Figure 20:
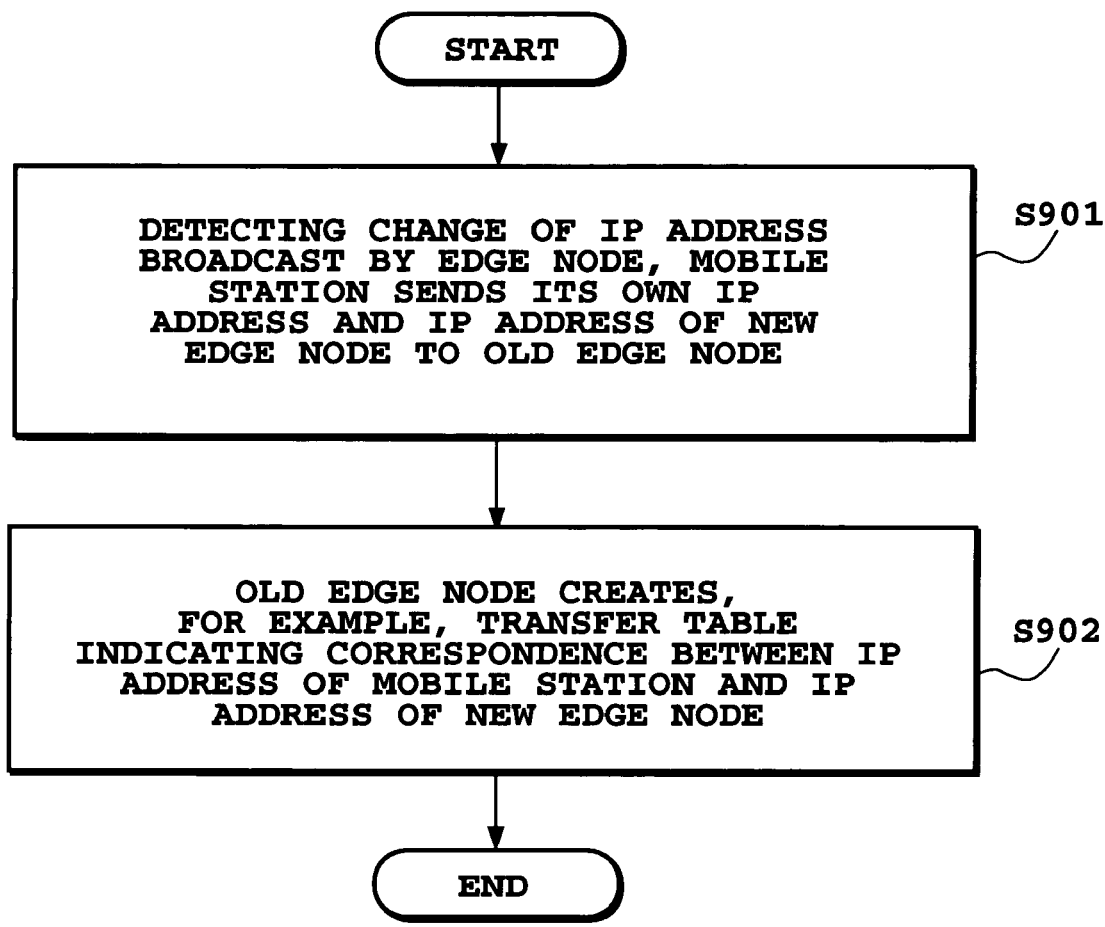
FIG. 20 is a flowchart illustrating the example of the second handover control in the mobile communications network of the third embodiment in accordance with the present invention.

FIG. 19 is a block diagram illustrating an example of the second handover control in the mobile communications network of the third embodiment in accordance with the present invention, and FIG. 20 is a flowchart illustrating the example of the second handover control in the mobile communications network of the third embodiment in accordance with the present invention. The handover control will be described by means of an example in which the mobile station 310 moves from the supervisory area of the edge node 306 to that of the edge node 307.

Detecting that the broadcast IP address is different from the currently stored IP address, the mobile station 310 decides that its visiting area changes, and transmits its own IP address and the IP address of the new edge node to the old edge node (step S901). In the example of FIG. 19, the mobile station 310 transmits its own IP address #10 and the IP address #7 of the new edge node 307 to the old edge node 306. The transmission to the edge node 306 is carried out through the edge node 307, repeater node 304, gate node 302 and repeater node 303, for example.

The old edge node creates a transfer table establishing the relationship between the IP address of the mobile station and the IP address of the new edge node (redirection edge node) (S902) so that when the old edge node thereafter receives data to which the IP address of the mobile station is added, it transmits (transfers) the data to the new edge node with adding the IP address of the new edge node to the data. In the example of FIG. 19, when receiving the data to which the IP address #10 of the mobile station 310 is added, the edge node 306 transmits the data to the edge node 307 with adding the IP address #7 of the edge node 307 to the data.

Using the second handover control can reduce the data (packet) loss as compared with using the first handover control.

In the second handover control, however, there is a possibility of transmission delay or aggregation because the data is transferred from the first visiting edge node of the mobile station. Therefore, it is possible to update the table of the party edge node as in the first handover control at some opportunity.

As for the opportunity for update, it is analogous to that of the first embodiment in accordance with the present invention.

The update of the table of the party edge node is carried out by transmitting from the old edge node to the party edge node the IP address of the mobile station and the IP address of the new edge node. After transmitting the IP addresses, the old edge node releases its own transfer table and the like, which is preferably released after the old edge node receives the notification from the party edge node that the update of its table is completed, to prevent data (packet) loss.

Incidentally, when employing the method of accessing the location information server 300 every time the edge node receives a packet, it is unnecessary for the edge node to possess the table, and hence to update the table of the party edge node during the handover. In this case, the moving mobile station notifies the location information server 300 of its own IP address and the IP address of the new edge node so that the location information server 300 updates its own information in accordance with the IP addresses.

When handover takes place in the method in which the edge node updates its table by periodically accessing the location information server 300, the table of the party edge node can be either updated in the same manner as the foregoing method, or not updated at all. When it is not updated, a packet loss can occur from the time of the handover to the next periodic update.

Embodiment 4

The fourth embodiment in accordance with the present invention also implements data transfer between mobile stations. The routing is carried out by the IP addresses of the mobile stations as in the second embodiment.

Figure 21:
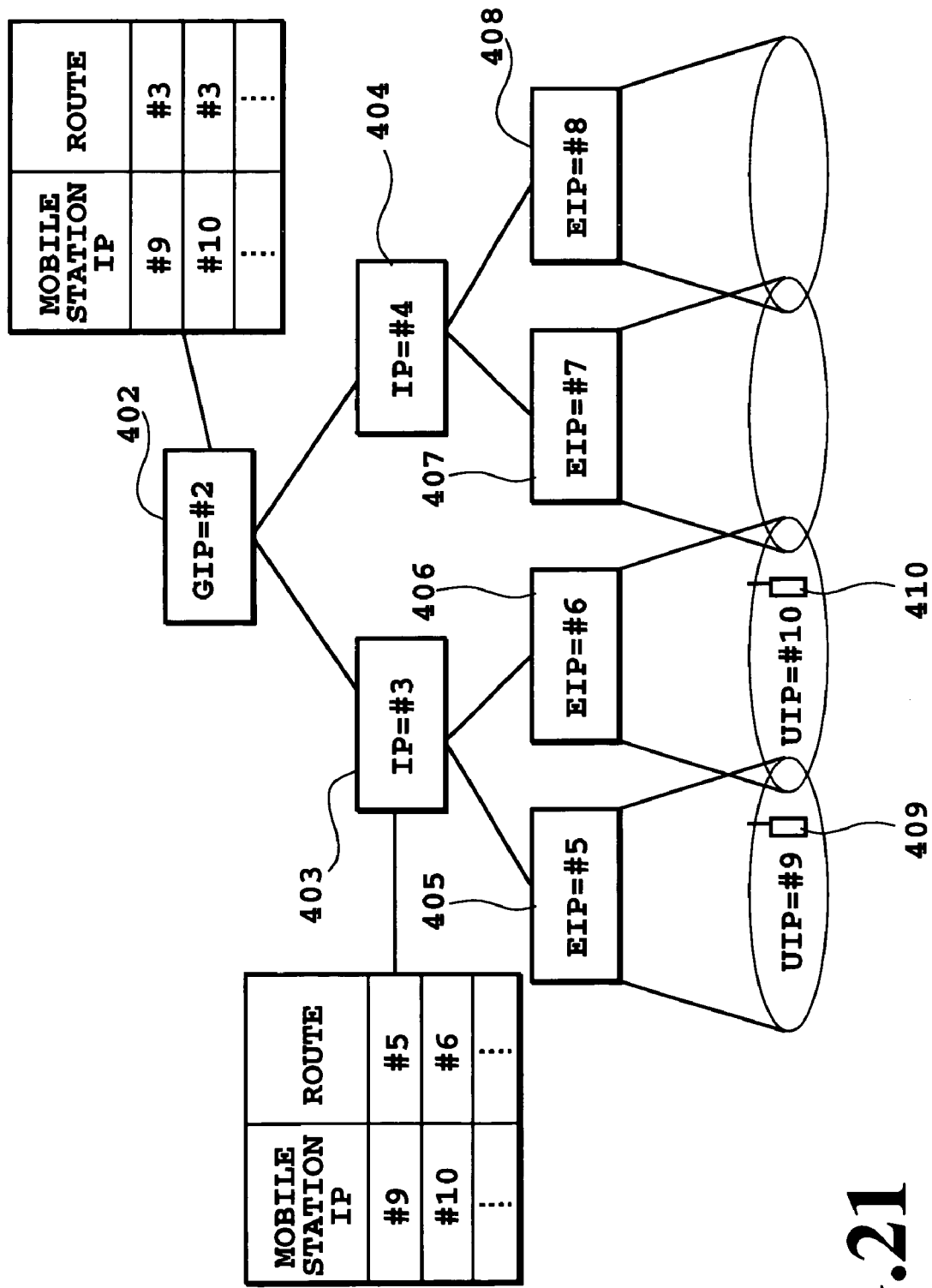
FIG. 21 is a block diagram showing a configuration of a mobile communications network of a fourth embodiment in accordance with the present invention.

FIG. 21 is a block diagram showing a configuration of a mobile communications network of the fourth embodiment in accordance with the present invention.

The mobile communications network of the present embodiment comprises a gate node 402, repeater nodes 403 and 404, and edge nodes 405–408, but not a location information server 400. The functions of the nodes are the same as those of their counterparts in the second embodiment.

The gate node 402, repeater nodes 403 and 404, and edge nodes 405–408 have their own IP addresses (#2, #3, #4, and #5–#8, respectively, in the present embodiment), and mobile stations 409 and 410 also have their own IP addresses (#9 and #10 in the present embodiment).

The gate node 402 and the repeater nodes 403 and 404 are a routing node for carrying out routing of the data in accordance with routing information.

Figure 22:
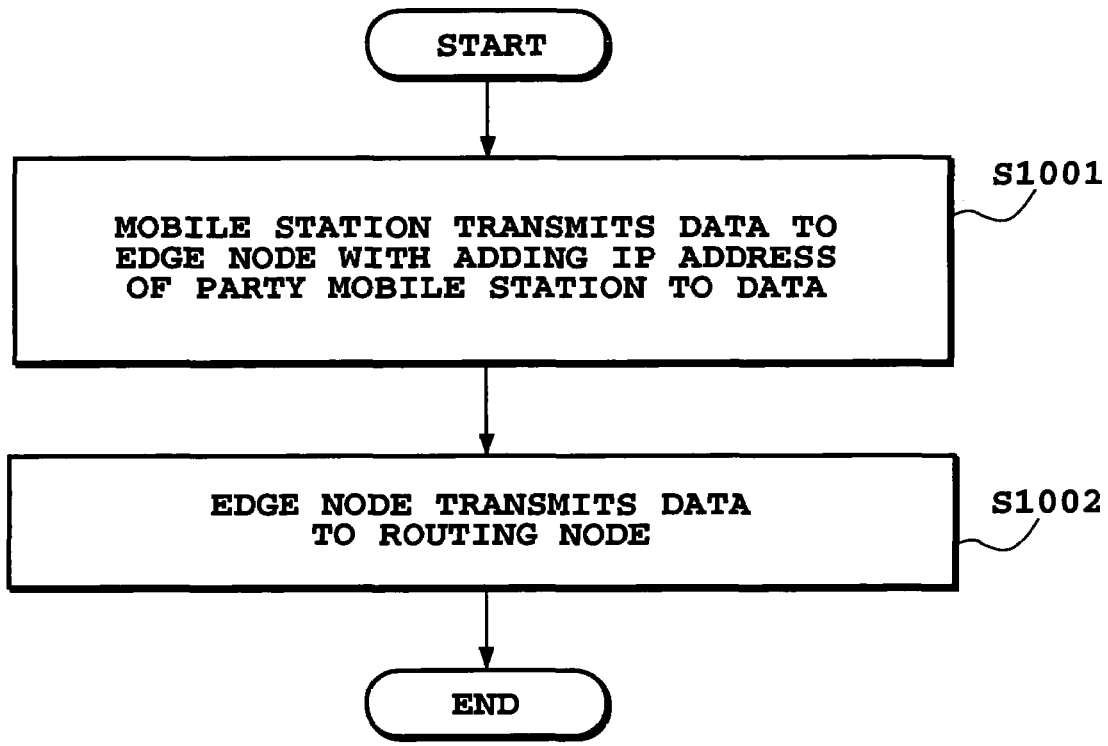
FIG. 22 is a flowchart illustrating an example of a data transfer method between mobile stations in the mobile communications network of the fourth embodiment in accordance with the present invention.

FIG. 22 is a flowchart illustrating part of a data transfer method between mobile stations in the mobile communications network of the fourth embodiment in accordance with the present invention.

Assume that a mobile station (409, for example) transmits data (IP packet) to the edge node (405, in this case) with adding the IP address (#10) of a party mobile station (410, for example) (step S1001).

Then, the edge node transmits the received data to the routing node (step S1002). In the example of FIG. 21, since each edge node is connected to only one repeater node as in the third embodiment, the data is transmitted to the corresponding one of the repeater nodes.

The subsequent routing of the data is analogous to that of the second embodiment. For example, the data transmitted from the mobile station 409 to the mobile station 410 is transmitted through the edge node 405, repeater node 403 and edge node 406, and arrives at the mobile station 410. The data transmission from the mobile station 410 to the mobile station 409 is carried out in a similar manner.

Figure 23:
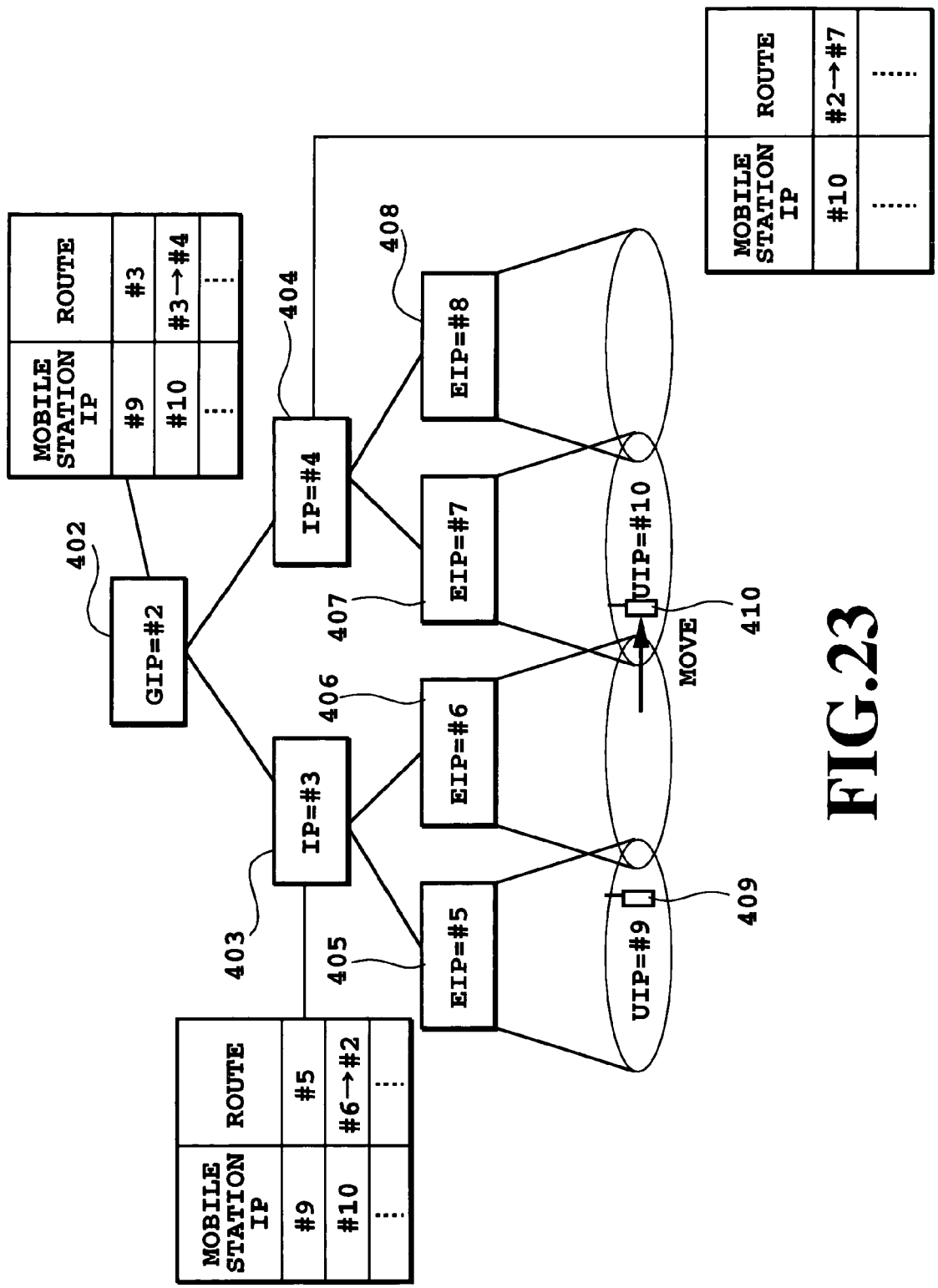
FIG. 23 is a block diagram illustrating an example of the first handover control in the mobile communications network of the fourth embodiment in accordance with the present invention.
Figure 24B:
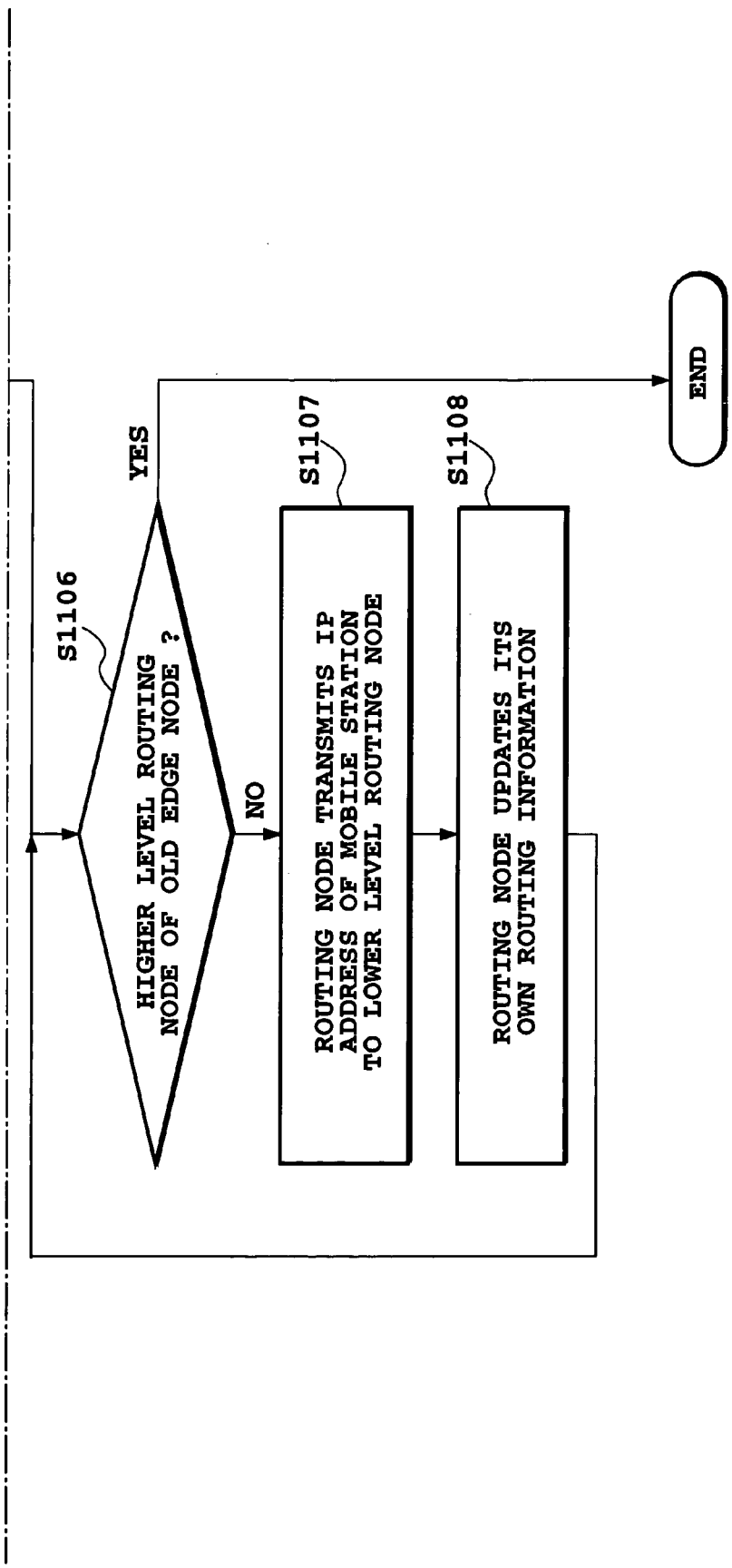

FIG. 23 is a block diagram illustrating an example of the first handover control in the mobile communications network of the fourth embodiment in accordance with the present invention, and FIGS. 24A and 24B are a flowchart illustrating the example of the first handover control in the mobile communications network of the fourth embodiment in accordance with the present invention. The handover control will be described by means of an example in which the mobile station 410 moves from the supervisory area of the edge node 406 to that of the edge node 407.

Detecting that the broadcast IP address is different from the currently stored IP address, the mobile station 410 decides that its visiting area changes, and transmits its own IP address to the edge node (S1101). In the example of FIG. 23, the mobile station 410 transmits its own IP address to the edge node 407.

The new edge node transmits the IP address of the moving mobile station to the higher level routing node (repeater node or gate node) (step S1102). Receiving the IP address of the mobile station, the routing node updates its own routing information about the (IP address of the) mobile station (or creates the information about the mobile station when there is no existing information) (step S1103), and transmits the IP address of the mobile station to the still higher level routing node. The processing is repeated up to the junction routing node of the transmission route to the old edge node and the transmission route to the new edge node (steps S1104 and S1105).

In the example of FIG. 23, the higher level routing node of the new edge node is the repeater node 404, and the junction routing node of the transmission route to the old edge node (edge node 406) and the transmission route to the new edge node (edge node 407) is the gate node 402. Accordingly, the repeater node 404 and gate node 402 update the routing information about the (IP address of the) mobile station 410.

Arriving at the junction routing node, the processing proceeds to step S1106. At step S1106, a decision is made as to whether the current node is the higher level routing node of the old edge node or not, and if the decision result is positive, the processing is completed. Otherwise, the IP address of the mobile station is transmitted to the lower level routing node directing to the old edge node (step S1107). The lower level routing node updates its own routing information about the IP address of the mobile station (step S1108). Specifically, when it receives the data addressed to the mobile station, it updates its own routing information such that the data is transmitted to its higher level routing node. Incidentally, it is also possible to eliminate the routing information about the mobile station at step S1108, in which case, each routing node transmits the received data to its higher level routing node if there is no routing information about the (IP address of the) mobile station. After step S1108, the processing proceeds to step S1106, again.

Figure 25:
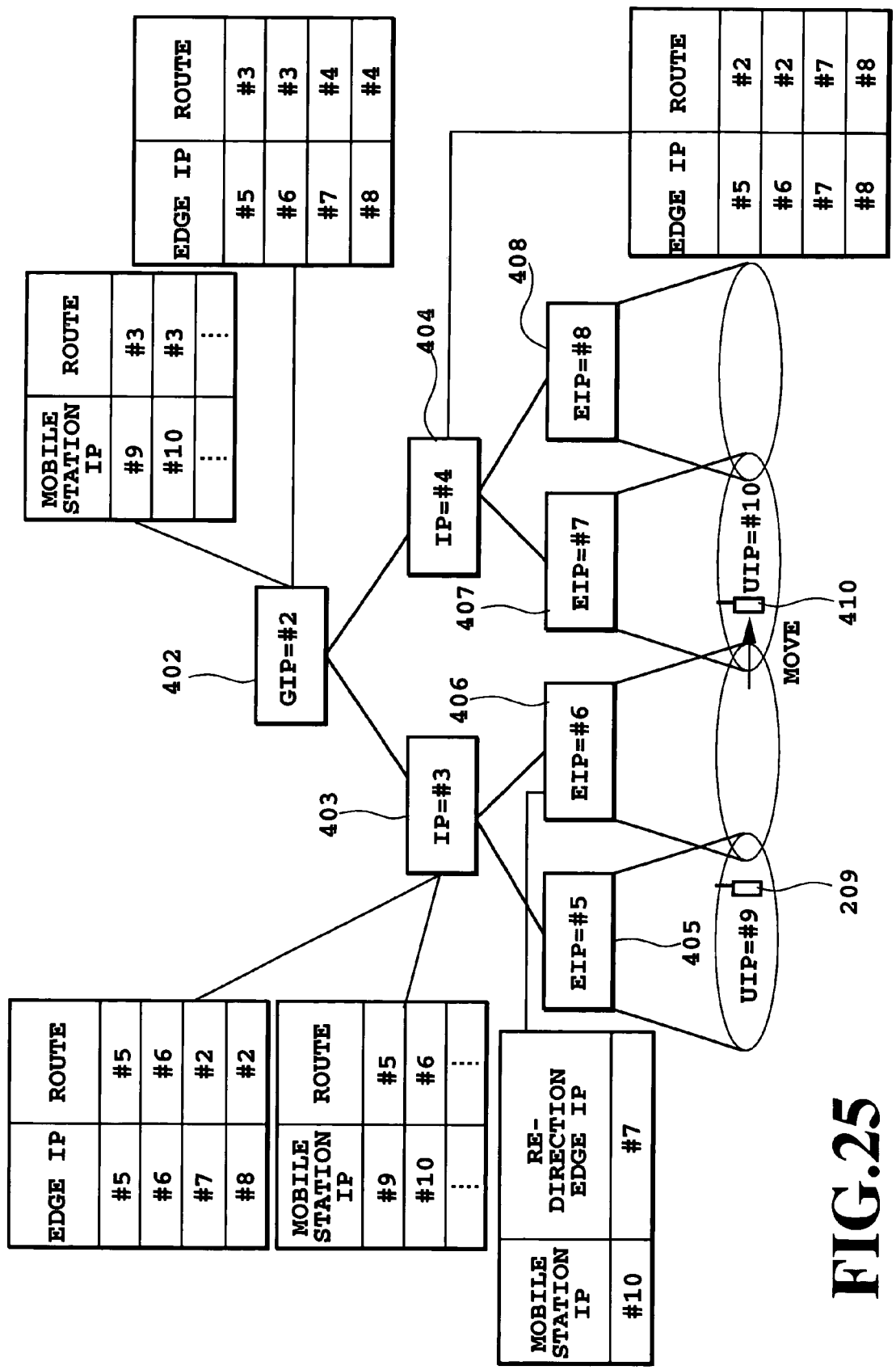
FIG. 25 is a block diagram illustrating an example of the second handover control in the mobile communications network of the fourth embodiment in accordance with the present invention.
Figure 26:
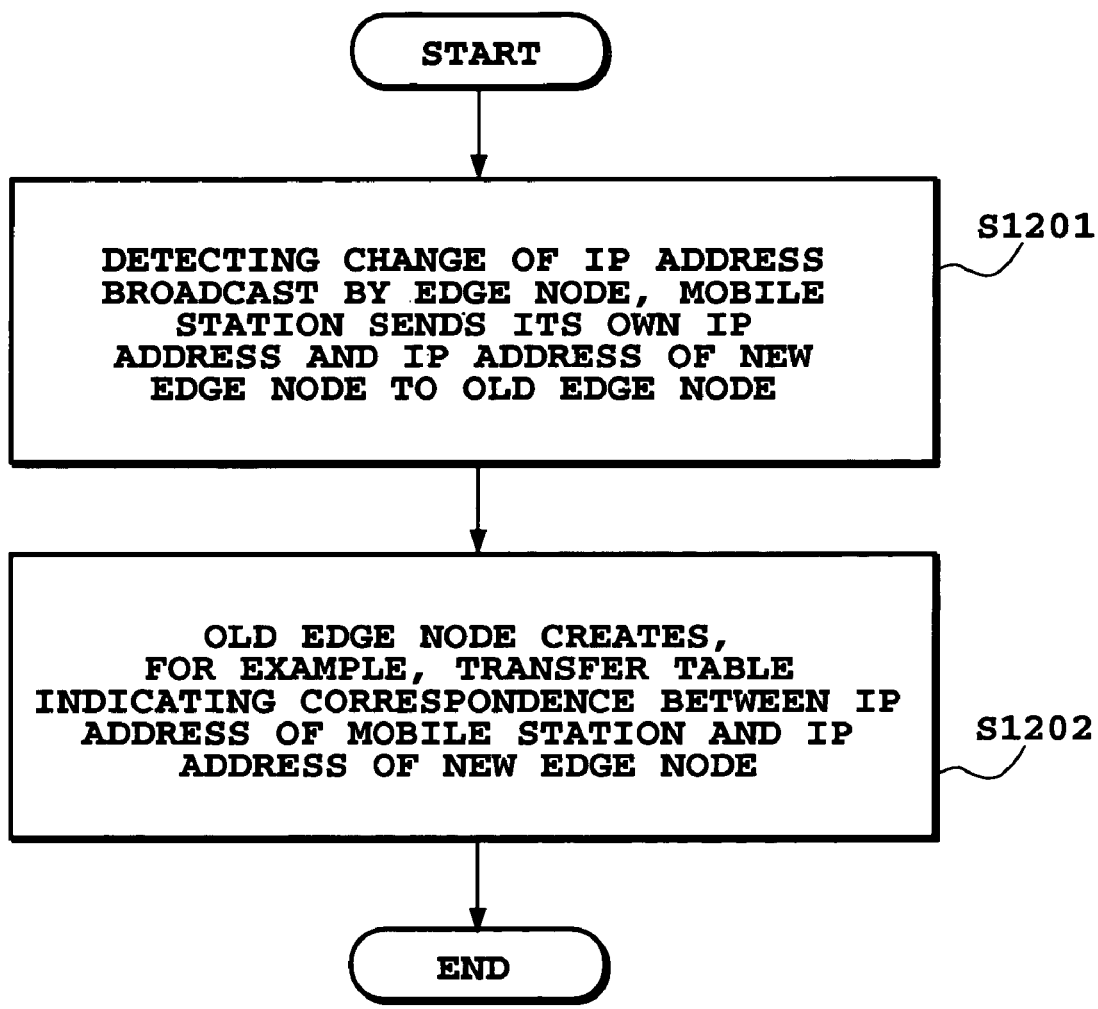
FIG. 26 is a flowchart illustrating the example of the second handover control in the mobile communications network of the fourth embodiment in accordance with the present invention.

FIG. 25 is a block diagram illustrating an example of the second handover control in the mobile communications network of the fourth embodiment in accordance with the present invention, and FIG. 26 is a flowchart illustrating the example of the second handover control in the mobile communications network of the fourth embodiment in accordance with the present invention. The handover control will be described by means of an example in which the mobile station 410 moves from the supervisory area of the edge node 406 to that of the edge node 407.

Detecting that the broadcast IP address is different from the currently stored IP address, the mobile station 410 decides that its visiting area changes, and transmits its own IP address and the IP address of the new edge node to the old edge node (step S1201). In the example of FIG. 25, the mobile station 410 transmits its own IP address #10 and the IP address #7 of the edge node 407 to the edge node 406. The transmission to the old edge node 406 is carried out by placing the transmission route information into the routing information of each routing node, for the IP addresses of the individual edge nodes as illustrated in FIG. 25.

The old edge node creates a transfer table establishing the relationship between the IP address of the mobile station and the IP address of the new edge node (redirection edge node) (S1202) so that when it thereafter receives data to which the IP address of the mobile station is added, it transmits (transfers) the data to the new edge node with adding the IP address of the new edge node to the data. In the example of FIG. 25, when receiving the data to which the IP address #10 of the mobile station 410 is added, the old edge node 406 transmits the data to the new edge node 407 with adding the IP address #7 of the edge node 407 to the data. The transmission to the new edge node 407 is carried out by placing the transmission route information about the IP address of the edge node into the routing information of each routing node as described above.

In the second handover control, however, there is a possibility of transmission delay or aggregation because the data is transferred from the first visiting edge node of the mobile station. Therefore, it is possible to update the table of the routing node as in the first handover control at some opportunity.

As for the opportunity for update, it is analogous to that of the first embodiment in accordance with the present invention.

The update of the routing information is carried out from the higher level routing node of the new edge node toward the junction node, and then from the junction node toward the higher level routing node of the old edge node as in the first handover control, for example. The release of the transfer table of the old edge node is preferably carried out after the update of the routing information of its higher level routing node is completed to prevent the data (packet) loss.

Supplements

A mobile communications network and a data delivery method can be implemented that have combined functions described in the foregoing embodiments (for example, those having the functions of the first and third embodiments).

Although the foregoing description separately explains the method of carrying out the routing in accordance with the IP address of the edge node (the first and third embodiments) and the method of carrying out the routing in accordance with the IP address of the mobile station (the second and fourth embodiments), a routing method combining the two methods is possible.

As described above, the present invention can implement the connectionless network and connectionless transfer with obviating the need for sending the call control signal in the data delivery in the mobile communications network.

In addition, it can prevent the network aggregation involved in delivering the same data to the users of the same group, thereby reducing the load of the data delivery server.

Moreover, it can implement control such as handover in such a connectionless network.

What is claimed is:

1. A mobile communications network comprising:

one or more routing nodes for receiving data to which the IP address of a mobile station is added, and for carrying out routing of the data in accordance with routing information; and one or more edge nodes for receiving the data routed by said routing nodes, and for transmitting the data to the mobile station corresponding to the IP address of the mobile station added to the data, wherein said mobile communications network further comprises:

a location information server for managing information about correspondence between the IP address of the mobile station and the IP address of the edge node that supervises an area visited by the mobile station, wherein said routing nodes include a gate node;

said gate node retrieves, by accessing said location information server, the IP address of the edge node supervising the area visited by the mobile station corresponding to the IP address of the mobile station added to the received data, and adds the IP address of the edge node to the received data;

said routing information includes information about correspondence between the IP address of the edge node and a transmission route; and said routing nodes carry out the routing of the received data in accordance with the IP address of the edge node added to the received data and the routing information, wherein the IP address of a group of mobile stations can be added as the IP address of the mobile station to be added to the data, wherein said location information server manages information about correspondence between the IP addresses of the mobile stations belonging to the group and the IP address of the group of the mobile stations;

said gate node retrieves, when the IP address of the group of the mobile stations is added to the received data, the IP addresses of the edge nodes supervising the areas visited by the mobile stations corresponding to the IP address of the group of the mobile stations by accessing said location information server, replicates the received data by the number of the edge nodes, adds to each of the data the IP address of each of the edge nodes and the IP addresses of the mobile stations visiting the supervisory area of the edge node, and carries out the routing of the data.

2. A mobile communications network comprising:

one or more routing nodes for receiving data to which the IP address of a mobile station is added, and for carrying out routing of the data in accordance with routing information; and one or more edge nodes for receiving the data routed by said routing nodes, and for transmitting the data to the mobile station corresponding to the IP address of the mobile station added to the data, wherein said mobile communications network further comprises:

a location information server for managing information about correspondence between the IP address of the mobile station and the IP address of the edge node that supervises an area visited by the mobile station, wherein said routing nodes include a gate node;

said gate node retrieves, by accessing said location information server, the IP address of the edge node supervising the area visited by the mobile station corresponding to the IP address of the mobile station added to the received data, and adds the IP address of the edge node to the received data;

said routing information includes information about correspondence between the IP address of the edge node and a transmission route; and said routing nodes carry out the routing of the received data in accordance with the IP address of the edge node added to the received data and the routing information, wherein when said mobile station moves from the supervisory area of an old edge node to the supervisory area of a new edge node, said moving mobile station transmits its own IP address and the IP address of the new edge node to the old edge node; and when said old edge node thereafter receives data to which the IP address of the moving mobile station is added, said old edge node transmits the data to said new edge node with adding the IP address of the new edge node to the data.

3. A mobile communications network comprising:

one or more routing nodes for receiving data to which the IP address of a mobile station is added, and for carrying out routing of the data in accordance with routing information; and one or more edge nodes for receiving the data routed by said routing nodes, and for transmitting the data to the mobile station corresponding to the IP address of the mobile station added to the data, wherein said routing information includes information about correspondence between the IP address of the mobile station and a transmission route, and wherein said routing nodes carry out the routing of the received data in accordance with the IP address of the mobile station added to the received data and the routing information, wherein the IP address of a group of mobile stations can be added as the IP address of the mobile station to be added to the data, and wherein said routing nodes have group information which is information about correspondence between the IP addresses of the mobile stations belonging to the group and the IP address of the group of the mobile stations, replicate, when the IP address of the group of the mobile stations is added to the received data, the received data by the number of transmission routes corresponding to the IP addresses of the mobile stations corresponding to the added IP address of the group of the mobile stations in accordance with the group information and the routing information and carry out the routing of the data.

4. A mobile communications network comprising:

one or more routing nodes for receiving data to which the IP address of a mobile station is added, and for carrying out routing of the data in accordance with routing information; and one or more edge nodes for receiving the data routed by said routing nodes, and for transmitting the data to the mobile station corresponding to the IP address of the mobile station added to the data, wherein said routing information includes information about correspondence between the IP address of the mobile station and a transmission route, and wherein said routing nodes carry out the routing of the received data in accordance with the IP address of the mobile station added to the received data and the routing information, wherein the IP address of the mobile station to be added to the data can include the IP addresses of a plurality of mobile stations, wherein said routing nodes replicate, when the IP addresses of the plurality of the mobile stations are added to the received data, the received data by the number of transmission routes corresponding to the IP addresses of the plurality of the mobile stations in accordance with the routing information, add to each of the data, the IP addresses of the mobile stations corresponding to each of the transmission routes, and carry out the routing of the data.

5. A mobile communications network comprising:

one or more routing nodes for receiving data to which the IP address of a mobile station is added, and for carrying out routing of the data in accordance with routing information; and one or more edge nodes for receiving the data routed by said routing nodes, and for transmitting the data to the mobile station corresponding to the IP address of the mobile station added to the data, wherein said routing information includes information about correspondence between the IP address of the mobile station and a transmission route, and wherein said routing nodes carry out the routing of the received data in accordance with the IP address of the mobile station added to the received data and the routing information, wherein said mobile station, when it moves from the supervisory area of an old edge node to the supervisory area of a new edge node, transmits its own IP address to said new edge node, and wherein each node from the higher level routing node of said new edge node up to a junction routing node from which transmission routes diverge to said old edge node and to said new edge node, updates its own routing information about the moving mobile station.

6. A mobile communications network comprising:

one or more routing nodes for receiving data to which the IP address of a mobile station is added, and for carrying out routing of the data in accordance with routing information; and one or more edge nodes for receiving the data routed by said routing nodes, and for transmitting the data to the mobile station corresponding to the IP address of the mobile station added to the data, wherein said routing information includes information about correspondence between the IP address of the mobile station and a transmission route, and wherein said routing nodes carry out the routing of the received data in accordance with the IP address of the mobile station added to the received data and the routing information, wherein said routing information includes information about correspondence between the IP address of the edge node and a transmission route, and wherein said routing nodes carry out the routing of the received data in accordance with the IP address of the edge node added to the received data and the routing information; and said mobile station notifies, when it moves from the supervisory area of an old edge node to the supervisory area of a new edge node, said old edge node of its own IP address and the IP address of the new edge node, and said old edge node transmits, when it thereafter receives data to which the IP address of the moving mobile station is added, the data to said new edge node with adding the IP address of the new edge node to the data.

7. A mobile communications network comprising:

one or more routing nodes for receiving data to which the IP address of a mobile station is added, and for carrying out routing of the data in accordance with routing information; and one or more edge nodes for receiving the data routed by said routing nodes, and for transmitting the data to the mobile station corresponding to the IP address of the mobile station added to the data, wherein said mobile communications network further comprises:

a location information server for managing information about correspondence between the IP address of the mobile station and the IP address of the edge node that supervises an area visited by the mobile station, wherein each of said edge nodes receives data which is transmitted by a mobile station visiting its own supervisory area and to which the IP address of the mobile station is added, retrieves by accessing said location information server the IP address of the edge node supervising the area visited by the mobile station corresponding to the IP address of the mobile station added to the received data, adds the IP address of the edge node to the received data, and transmits the data to said routing node;

said routing information includes information about correspondence between the IP address of the edge node and a transmission route; and said routing nodes carry out the routing of the received data in accordance with the IP address of the edge node added to the received data and the routing information.

8. The mobile communications network as claimed in claim 7, wherein said edge node generates and manages information about correspondence between the IP address of the mobile station added to the received data and the IP address of the edge node supervising the area visited by the mobile station.

9. The mobile communications network as claimed in 8, wherein when said mobile station moves from the supervisory area of an old edge node to the supervisory area of a new edge node during communication with another mobile station, said moving, mobile station transmits its own IP address and the IP address of the new edge node to the edge node supervising the area visited by a party mobile station; and said edge node updates information about correspondence between the IP address of the moving mobile station and the IP address of the edge node supervising the area visited by the moving mobile station.

10. The mobile communications network as claimed in claim 8, wherein when said mobile station moves from the supervisory area of an old edge node to the supervisory area of a new edge node, said moving mobile station transmits its own IP address and the IP address of the new edge node to the old edge node; and when said old edge node thereafter receives data to which the IP address of the moving mobile station is added, said old edge node transmits the data to said new edge node with adding the IP address of the new edge node to the data.

11. The mobile communications network as claimed in claim 7, wherein when said mobile station moves from the supervisory area of an old edge node to the supervisory area of a new edge node, said moving mobile station notifies said location information server of its own IP address and the IP address of the new edge node; and said location information server updates information about correspondence between the IP address of the moving mobile station and the IP address of the edge node supervising the area visited by the moving mobile station.

12. A mobile communications network comprising:
one or more routing nodes for receiving data to which the IP address of a mobile station is added, and for carrying out routing of the data in accordance with routing information; and
one or more edge nodes for receiving the data routed by said routing nodes, and for transmitting the data to the mobile station corresponding to the IP address of the mobile station added to the data,
wherein each of said edge nodes receives data which is transmitted by a mobile station visiting its own supervisory area and to which the IP address of the mobile station is added, and transmits the data to said routing node;
said routing information includes information about correspondence between the IP address of the mobile station and a transmission route; and
said routing nodes carry out the routing of the received data in accordance with the IP address of the mobile station added to the received data and the routing information,
wherein said mobile station, when it moves from the supervisory area of an old edge node to the supervisory area of a new edge node, transmits its own IP address to said new edge node, and wherein each node from the higher level routing node of said new edge node up to a junction routing node from which transmission routes diverge to said old edge node and to said new edge node, and from the junction routing node to the higher routing node of said old edge node, updates its own routing information about the moving mobile station.

13. A mobile communications network, comprising:
one or more routing nodes for receiving data to which the IP address of a mobile station is added, and for carrying out routing of the data in accordance with routing information; and
one or more edge nodes for receiving the data routed by said routing nodes, and for transmitting the data to the mobile station corresponding to the IP address of the mobile station added to the data,
wherein each of said edge nodes receives data which is transmitted by a mobile station visiting its own supervisory area and to which the IP address of the mobile station is added, and transmits the data to said routing node;
said routing information includes information about correspondence between the IP address of the mobile station and a transmission route; and
said routing nodes carry out the routing of the received data in accordance with the IP address of the mobile station added to the received data and the routing information, wherein said routing information includes information about correspondence between the IP address of the edge node and a transmission route, and wherein
said routing nodes carry out the routing of the received data in accordance with the IP address of the edge node added to the received data and the routing information; and said mobile station notifies, when it moves from the supervisory area of an old edge node to the supervisory area of a new edge node, said old edge node of its own IP address and the IP address of the new edge node, and said old edge node transmits, when it thereafter receives data to which the IP address of the moving mobile station is added, the data to said new edge node with adding the IP address of the new edge node to the data.

14. A data delivery method in a mobile communications network including one or more routing nodes and one or more edge nodes, said data delivery method comprising the steps of:
receiving, at said routing nodes, data to which the IP address of a mobile station is added, and carrying out routing of the data in accordance with routing information; and
receiving, at said edge nodes, the data routed by said routing nodes, and transmitting the data to the mobile station corresponding to the IP address of the mobile station added to the data,
wherein said mobile communications network further includes:
a location information server for managing information about correspondence between the IP address of the mobile station and the IP address of the edge node that supervises an area visited by the mobile station, wherein
said routing nodes include a gate node;
said gate node retrieves, by accessing said location information server, the IP address of the edge node supervising the area visited by the mobile station corresponding to the IP address of the mobile station added to the received data, and adds the IP address of the edge node to the received data;
said routing information includes information about correspondence between the IP address of the edge node and a transmission route; and
said routing nodes carry out the routing of the received data in accordance with the IP address of the edge node added to the received data and the routing information, wherein the IP address of a group of mobile stations can be added as the IP address of the mobile station to be added to the data, wherein
said location information server manages information about correspondence between the IP addresses of the mobile stations belonging to the group and the IP address of the group of the mobile stations;
said gate node retrieves, when the IP address of the group of the mobile stations is added to the received data, the IP addresses of the edge nodes supervising the areas visited by the mobile stations corresponding to the IP address of the group of the mobile stations by accessing said location information server, replicates the received data by the number of the edge nodes, adds to each of the data the IP address of each of the edge nodes and the IP addresses of the mobile stations visiting the supervisory area of the edge node, and carries out the routing of the data.

15. A data delivery method in a mobile communications network including one or more routing nodes and one or more edge nodes, said data delivery method comprising the steps of:
receiving, at said routing nodes, data to which the IP address of a mobile station is added, and carrying out routing of the data in accordance with routing information; and receiving, at said edge nodes, the data routed by said routing nodes, and transmitting the data to the mobile station corresponding to the IP address of the mobile station added to the data, wherein said mobile communications network further includes:

a location information server for managing information about correspondence between the IP address of the mobile station and the IP address of the edge node that supervises an area visited by the mobile station, wherein said routing nodes include a gate node;

said gate node retrieves, by accessing said location information server, the IP address of the edge node supervising the area visited by the mobile station corresponding to the IP address of the mobile station added to the received data, and adds the IP address of the edge node to the received data;

said routing information includes information about correspondence between the IP address of the edge node and a transmission route; and said routing nodes carry out the routing of the received data in accordance with the IP address of the edge node added to the received data and the routing information, wherein when said mobile station moves from the supervisory area of an old edge node to the supervisory area of a new edge node, said moving mobile station transmits its own IP address and the IP address of the new edge node to the old edge node; and when said old edge node thereafter receives data to which the IP address of the moving mobile station is added, said old edge node transmits the data to said new edge node with adding the IP address of the new edge node to the data.

16. A data delivery method in a mobile communications network including one or more routing nodes and one or more edge nodes, said data delivery method comprising the steps of:

receiving, at said routing nodes, data to which the IP address of a mobile station is added, and carrying out routing of the data in accordance with routing information; and receiving, at said edge nodes, the data routed by said routing nodes, and transmitting the data to the mobile station corresponding to the IP address of the mobile station added to the data, wherein said routing information includes information about correspondence between the IP address of the mobile station and a transmission route, and wherein said routing nodes carry out the routing of the received data in accordance with the IP address of the mobile station added to the received data and the routing information, wherein the IP address of a group of mobile stations can be added as the IP address of the mobile station to be added to the data, and wherein said routing nodes have group information which is information about correspondence between the IP addresses of the mobile stations belonging to the group and the IP address of the group of the mobile stations, replicate, when the IP address of the group of the mobile stations is added to the received data, the received data by the number of the transmission routes corresponding to the IP addresses of the mobile stations corresponding to the added IP address of the group of the mobile stations in accordance with the group information and the routing information and carry out the routing of the data.

17. A data delivery method in a mobile communications network including one or more routing nodes and one or more edge nodes, said data delivery method comprising the steps of:

receiving, at said routing nodes, data to which the IP address of a mobile station is added, and carrying out routing of the data in accordance with routing information; and receiving, at said edge nodes, the data routed by said routing nodes, and transmitting the data to the mobile station corresponding to the IP address of the mobile station added to the data, wherein said routing information includes information about correspondence between the IP address of the mobile station and a transmission route, and wherein said routing nodes carry out the routing of the received data in accordance with the IP address of the mobile station added to the received data and the routing information, wherein the IP address of the mobile station to be added to the data can include the IP addresses of a plurality of mobile stations, wherein said routing nodes replicate, when the IP addresses of the plurality of the mobile stations are added to the received data, the received data by the number of transmission routes corresponding to the IP addresses of the plurality of the mobile stations in accordance with the routing information, add to each of the data, the IP addresses of the mobile stations corresponding to each of the transmission routes, and carry out the routing of the data.

18. A data delivery method in a mobile communications network including one or more routing nodes and one or more edge nodes, said data delivery method comprising the steps of:

receiving, at said routing nodes, data to which the IP address of a mobile station is added, and carrying out routing of the data in accordance with routing information; and receiving, at said edge nodes, the data routed by said routing nodes, and transmitting the data to the mobile station corresponding to the IP address of the mobile station added to the data, wherein said routing information includes information about correspondence between the IP address of the mobile station and a transmission route, and wherein said routing nodes carry out the routing of the received data in accordance with the IP address of the mobile station added to the received data and the routing information, wherein said mobile station, when it moves from the supervisory area of an old edge node to the supervisory area of a new edge node, transmits its own IP address to said new edge node, and wherein each node from the higher level routing node of said new edge node up to a junction routing node from which transmission routes diverge to said old edge node and to said new edge node, updates its own routing information about the moving mobile station.

19. A data delivery method in a mobile communications network including one or more routing nodes and one or more edge nodes, said data delivery method comprising the steps of:

receiving, at said routing nodes, data to which the IP address of a mobile station is added, and carrying out routing of the data in accordance with routing information; and receiving, at said edge nodes, the data routed by said routing nodes, and transmitting the data to the mobile station corresponding to the IP address of the mobile station added to the data, wherein said routing information includes information about correspondence between the IP address of the mobile station and a transmission route, and wherein said routing nodes carry out the routing of the received data in accordance with the IP address of the mobile station added to the received data and the routing information, wherein said routing information includes information about correspondence between the IP address of the edge node and a transmission route, and wherein said routing nodes carry out the routing of the received data in accordance with the IP address of the edge node added to the received data and the routing information; and said mobile station notifies, when it moves from the supervisory area of an old edge node to the supervisory area of a new edge node, said old edge node of its own IP address and the IP address of the new edge node, and said old edge node transmits, when it thereafter receives data to which the IP address of the moving mobile station is added, the data to said new edge node with adding the IP address of the new edge node to the data.

20. A data delivery method in a mobile communications network including one or more routing nodes and one or more edge nodes, said data delivery method comprising the steps of:

receiving, at said routing nodes, data to which the IP address of a mobile station is added, and carrying out routing of the data in accordance with routing information; and receiving, at said edge nodes, the data routed by said routing nodes, and transmitting the data to the mobile station corresponding to the IP address of the mobile station added to the data, wherein said mobile communications network further includes:

a location information server for managing information about correspondence between the IP address of the mobile station and the IP address of the edge node that supervises an area visited by the mobile station, wherein each of said edge nodes receives data which is transmitted by a mobile station visiting its own supervisory area and to which the IP address of the mobile station is added, retrieves by accessing said location information server the IP address of the edge node supervising the area visited by the mobile station corresponding to the IP address of the mobile station added to the received data, adds the IP address of the edge node to the received data, and transmits the data to said routing node;

said routing information includes information about correspondence between the IP address of the edge node and a transmission route; and said routing nodes carry out the routing of the received data in accordance with the IP address of the edge node added to the received data and the routing information.

21. A data delivery method in a mobile communications network including one or more routing nodes and one or more edge nodes, said data delivery method comprising the steps of:

receiving, at said routing nodes, data to which the IP address of a mobile station is added, and carrying out routing of the data in accordance with routing information; and receiving, at said edge nodes, the data routed by said routing nodes, and transmitting the data to the mobile station corresponding to the IP address of the mobile station added to the data, wherein each of said edge nodes receives data which is transmitted by a mobile station visiting its own supervisory area and to which the IP address of the mobile station is added, and transmits the data to said routing node;

said routing information includes information about correspondence between the IP address of the mobile station and a transmission route; and said routing nodes carry out the routing of the received data in accordance with the IP address of the mobile station added to the received data and the routing information, wherein said mobile station, when it moves from the supervisory area of an old edge node to the supervisory area of a new edge node, transmits its own IP address to said new edge node, and wherein each node from the higher level routing node of said new edge node up to a junction routing node from which transmission routes diverge to said old edge node and to said new edge node, and from the junction routing node to the higher routing node of said old edge node, updates its own routing information about the moving mobile station.

22. A data delivery method in a mobile communications network including one or more routing nodes and one or more edge nodes, said data delivery method comprising the steps of:

receiving, at said routing nodes, data to which the IP address of a mobile station is added, and carrying out routing of the data in accordance with routing information; and receiving, at said edge nodes, the data routed by said routing nodes, and transmitting the data to the mobile station corresponding to the IP address of the mobile station added to the data, wherein each of said edge nodes receives data which is transmitted by a mobile station visiting its own supervisory area and to which the IP address of the mobile station is added, and transmits the data to said routing node;

said routing information includes information about correspondence between the IP address of the mobile station and a transmission route; and said routing nodes carry out the routing of the received data in accordance with the IP address of the mobile station added to the received data and the routing information, wherein said routing information includes information about correspondence between the IP address of the edge node and a transmission route, and wherein said routing nodes carry out the routing of the received data in accordance with the IP address of the edge node added to the received data and the routing information; and said mobile station notifies, when it moves from the supervisory area of an old edge node to the supervisory area of a new edge node, said old edge node of its own IP address and the IP address of the new edge node, and said old edge node transmits, when it thereafter receives data to which the IP address of the moving mobile station is added, the data to said new edge node with adding the IP address of the new edge node to the data.

* * * * *

UNITED STATES PATENT AND TRADEMARK OFFICE
CERTIFICATE OF CORRECTION

PATENT NO. : 6,958,988 B1  Page 1 of 2
APPLICATION NO. : 09/762193
DATED : October 25, 2005
INVENTOR(S) : Takatoshi Okagawa et al.

It is certified that error appears in the above-identified patent and that said Letters Patent is hereby corrected as shown below:

Cover Page
Item 56, References Cited, FOREIGN PATENT DOCUMENTS, insert the following references:
    JP    2000101627    4/2000
    JP    2000217157    8/2000
    JP    11-355281    12/1999
    EP    0 963 087  A1    12/1999

Column 3
Line 22, change "comprises:" to --comprise--

Column 4
Line 23, after "old edge" remove [is]

Column 6
Line 63, after "(IP packet)" change "is" to --are--

Column 7
Line 3, change "5102" to --S102--
Line 51, after "information" insert --defining--
Line 64, after "information" insert --defining--

Column 8
Line 2, remove [is]

Column 9
Line 13, remove [315]
Line 33, boldface "#5"
Line 37, boldface "#9"
Line 39, boldface "#6"

Column 10
Line 21, change "As" to --At--
Line 24, after "update" remove [is]
Line 61 and 62, change "a routing node" to --routing nodes--

Column 11
Line 38, boldface "#9"
Line 38, boldface "#5"

UNITED STATES PATENT AND TRADEMARK OFFICE
CERTIFICATE OF CORRECTION

PATENT NO.         :   6,958,988 B1
APPLICATION NO.    :   09/762193
DATED              :   October 25, 2005
INVENTOR(S)        :   Takatoshi Okagawa et al.

It is certified that error appears in the above-identified patent and that said Letters Patent is hereby corrected as shown below:

Column 12
Line 22, after "Thus" insert --,--
Line 22, after "mobile" remove [,]
Line 39, change "transmits" to --transmit--
Line 44, before "visiting" insert --are--

Column 13
Line 9, change "stores" to --store--
Line 24, after "Such" remove [a]

Column 14
Line 38, change "stores" to --store--

Column 15
Line 49, change "a routing node" to --routing nodes--

Column 17
Line 8, after "Using" change "the" to --this--

Column 18
Line 44, remove [400]
Line 53, change "a routing node" to --routing nodes--

Signed and Sealed this

Twenty-second Day of August, 2006

JON W. DUDAS
*Director of the United States Patent and Trademark Office*